US011348064B1

(12) United States Patent
Altenhoff et al.

(10) Patent No.: US 11,348,064 B1
(45) Date of Patent: May 31, 2022

(54) SYSTEM AND METHODS FOR ALTERNATE PATH GENERATION

(71) Applicant: Airspace Technologies, Inc., Carslbad, CA (US)

(72) Inventors: Raja Sol Altenhoff, Carlsbad, CA (US); Ryan Rusnak, Encinitas, CA (US)

(73) Assignee: Airspace Technologies, Inc., Carlsbad, CA (US)

( * ) Notice: Subject to any disclaimer, the term of this patent is extended or adjusted under 35 U.S.C. 154(b) by 0 days.

(21) Appl. No.: 17/400,420

(22) Filed: Aug. 12, 2021

(51) Int. Cl.
| G06Q 10/08 | (2012.01) |
| G01C 21/36 | (2006.01) |
| G01C 21/34 | (2006.01) |
| G06Q 50/28 | (2012.01) |

(52) U.S. Cl.
CPC ... *G06Q 10/08355* (2013.01); *G01C 21/3415* (2013.01); *G01C 21/3667* (2013.01); *G06Q 10/0833* (2013.01); *G06Q 50/28* (2013.01)

(58) Field of Classification Search
CPC ............. G01C 21/3415; G01C 21/3667
See application file for complete search history.

(56) References Cited

U.S. PATENT DOCUMENTS

| 4,905,233 A * | 2/1990 | Cain ........................ H04L 45/00 370/237 |
| 5,561,790 A * | 10/1996 | Fusaro .................... G06F 30/18 703/26 |
| 6,098,107 A * | 8/2000 | Narvaez-Guarnieri ...................... H04L 45/02 709/239 |
| 6,192,314 B1 * | 2/2001 | Khavakh ............ G01C 21/3492 701/410 |
| 6,529,498 B1 * | 3/2003 | Cheng .................... H04L 12/185 370/395.3 |
| 6,600,724 B1 * | 7/2003 | Cheng ..................... H04L 45/00 370/395.31 |
| 7,280,481 B2 * | 10/2007 | Rong ..................... H04L 45/122 709/241 |
| 7,774,734 B2 * | 8/2010 | Goldberg ........... G01C 21/3446 716/132 |
| 8,005,610 B2 * | 8/2011 | Bast .................... G01C 21/3446 701/428 |

(Continued)

FOREIGN PATENT DOCUMENTS

WO  WO-2014066562 A2 * 5/2014 ......... G01C 21/3476

OTHER PUBLICATIONS

Aljazzar, Husain et al., "A heuristic search algorithm for finding the κ shortest paths," Artificial Intelligence 175 (2011) 2129-2154 Elsevier Science B.V.

*Primary Examiner* — Luis A Martinez Borrero
(74) *Attorney, Agent, or Firm* — Sterne, Kessler, Goldstein & Fox P.L.L.C.

(57) ABSTRACT

A computing system for alternate path generation is disclosed. In aspects, the computing system can implement methods to generate the alternate paths by: identifying an optimal path to a destination node on a first graph, generating a path graph, and generating an alternate path sequence based on the path graph. In aspects, the computing system can further generate an interactive graphical user interface (GUI) for displaying the alternate path sequence and transmit the interactive GUI to a display unit for display.

20 Claims, 20 Drawing Sheets

(56) References Cited

U.S. PATENT DOCUMENTS

| | | | |
|---|---|---|---|
| 8,126,641 B2* | 2/2012 | Horvitz | G01C 21/3415 |
| | | | 701/425 |
| 9,037,397 B2* | 5/2015 | Peri | G01C 21/3453 |
| | | | 701/425 |
| 9,151,614 B2* | 10/2015 | Poppen | G01C 21/3679 |
| 9,542,774 B2* | 1/2017 | Marshall | G06T 17/20 |
| 9,557,182 B2* | 1/2017 | Nesbitt | H04L 45/00 |
| 9,726,510 B2* | 8/2017 | Peri | G01C 21/3476 |
| 10,274,328 B2* | 4/2019 | Grochocki, Jr. | G01C 21/3676 |
| 10,547,536 B2* | 1/2020 | Chen | H04L 45/745 |
| 10,928,217 B2* | 2/2021 | Yang | G01C 21/3614 |
| 11,047,699 B2* | 6/2021 | Rolf | G08G 1/0141 |
| 11,054,277 B2* | 7/2021 | Rolf | G01C 21/20 |
| 11,080,336 B2* | 8/2021 | Van Dusen | G06Q 50/01 |
| 11,137,259 B2* | 10/2021 | Rolf | G01C 21/3446 |
| 11,187,546 B2* | 11/2021 | Rolf | G01C 21/3889 |
| 11,193,779 B2* | 12/2021 | Cajias | G01C 21/3476 |
| 2003/0060977 A1* | 3/2003 | Jijina | G08G 1/096861 |
| | | | 701/414 |
| 2003/0084424 A1* | 5/2003 | Reddy | G06F 8/71 |
| | | | 717/105 |
| 2007/0112507 A1* | 5/2007 | Bargeron | G09B 29/106 |
| | | | 701/425 |
| 2008/0004802 A1* | 1/2008 | Horvitz | G01C 21/3415 |
| | | | 701/533 |
| 2009/0040931 A1* | 2/2009 | Bast | G01C 21/3446 |
| | | | 370/238 |
| 2010/0312466 A1* | 12/2010 | Katzer | G08G 1/096827 |
| | | | 701/533 |
| 2011/0137551 A1* | 6/2011 | Peri | G01C 21/3453 |
| | | | 701/533 |
| 2012/0016582 A1* | 1/2012 | Cerecke | G01C 21/3446 |
| | | | 701/410 |
| 2012/0139921 A1* | 6/2012 | Marshall | G06T 17/20 |
| | | | 345/428 |
| 2012/0254153 A1* | 10/2012 | Abraham | G06F 16/353 |
| | | | 707/812 |
| 2014/0142849 A1* | 5/2014 | Ziezold | G01C 21/3664 |
| | | | 701/538 |
| 2014/0207376 A1* | 7/2014 | Nesbitt | H04L 45/12 |
| | | | 701/527 |
| 2015/0285652 A1* | 10/2015 | Peri | G01C 21/3476 |
| | | | 701/438 |
| 2016/0252363 A1* | 9/2016 | Tertoolen | G06V 20/588 |
| | | | 701/410 |
| 2017/0262790 A1* | 9/2017 | Khasis | G08G 1/0116 |
| 2017/0364968 A1* | 12/2017 | Gopalakrishnan | |
| | | | G01C 21/3453 |
| 2018/0051997 A1* | 2/2018 | Grochocki, Jr. | G01C 21/3415 |
| 2018/0143643 A1* | 5/2018 | Fairfield | G08G 1/096833 |
| 2018/0209802 A1* | 7/2018 | Jung | G01C 21/3415 |
| 2019/0020573 A1* | 1/2019 | Chen | H04L 45/54 |
| 2019/0033092 A1* | 1/2019 | Yang | G01C 21/34 |
| 2019/0196503 A1* | 6/2019 | Abari | G06Q 10/00 |
| 2019/0316922 A1* | 10/2019 | Petersen | A61B 5/165 |
| 2020/0370902 A1* | 11/2020 | Rolf | G01C 21/3446 |
| 2020/0370903 A1* | 11/2020 | Rolf | G01C 21/3446 |
| 2020/0370908 A1* | 11/2020 | Cajias | G01C 21/3476 |
| 2021/0073282 A1* | 3/2021 | Hunter | G06F 8/35 |
| 2021/0364301 A1* | 11/2021 | Cajias | G01C 21/3667 |
| 2021/0364303 A1* | 11/2021 | Rolf | G01C 21/3859 |
| 2021/0364308 A1* | 11/2021 | Cajias | G01C 21/3446 |
| 2021/0364316 A1* | 11/2021 | Cajias | G06F 16/325 |
| 2021/0364317 A1* | 11/2021 | Cajias | G01C 21/3453 |
| 2021/0364318 A1* | 11/2021 | Rolf | G01C 21/387 |

* cited by examiner

FIG. 9

SYSTEM AND METHODS FOR ALTERNATE PATH GENERATION

TECHNICAL FIELD

Aspects of the present disclosure relate generally to a computing system for alternate path generation for use in transportation and logistics.

BACKGROUND

Transportation and logistics are vitally important for commercial activities. For example, it is important to be able to efficiently schedule and transport goods and/or personnel from place to place. This often involves complex scheduling between carriers (e.g., airlines, ships, trucks, etc.) and other entities (e.g., warehouses, ports, storage facilities, factories, pick up locations, etc.). However, often during the transportation process certain unforeseen events occur—including interruptions to transportation routes as a result of weather or other natural disasters, delays in shipments of goods and personnel due to damaged or broken vessels and/or vehicles, cancelation of orders, etc. Thus, systems and methods are needed to quickly and dynamically modify the transportation and logistics needs if these unforeseen events occur. The modifications can include providing alternate routes to ensure smooth transport of the goods and personnel from place to place, rerouting resources, goods, or personnel, etc. Despite technological advancements, current technologies still lack the ability to perform such modifications efficiently. Accordingly, there remains a need for improved techniques to solve the aforementioned problem.

BRIEF DESCRIPTION OF THE DRAWINGS

The accompanying drawings, which are incorporated herein and form a part of the specification, illustrate aspects of the present disclosure and, together with the description, further serve to explain the principles of the disclosure and to enable a person skilled in the pertinent art to make and use the disclosure.

FIGS. 7-9 show graphical user interfaces (GUIs) for displaying the alternate path sequence, and for allowing a user to interface with the computing system, according to aspects of the present disclosure.

DETAILED DESCRIPTION

Figure 1:
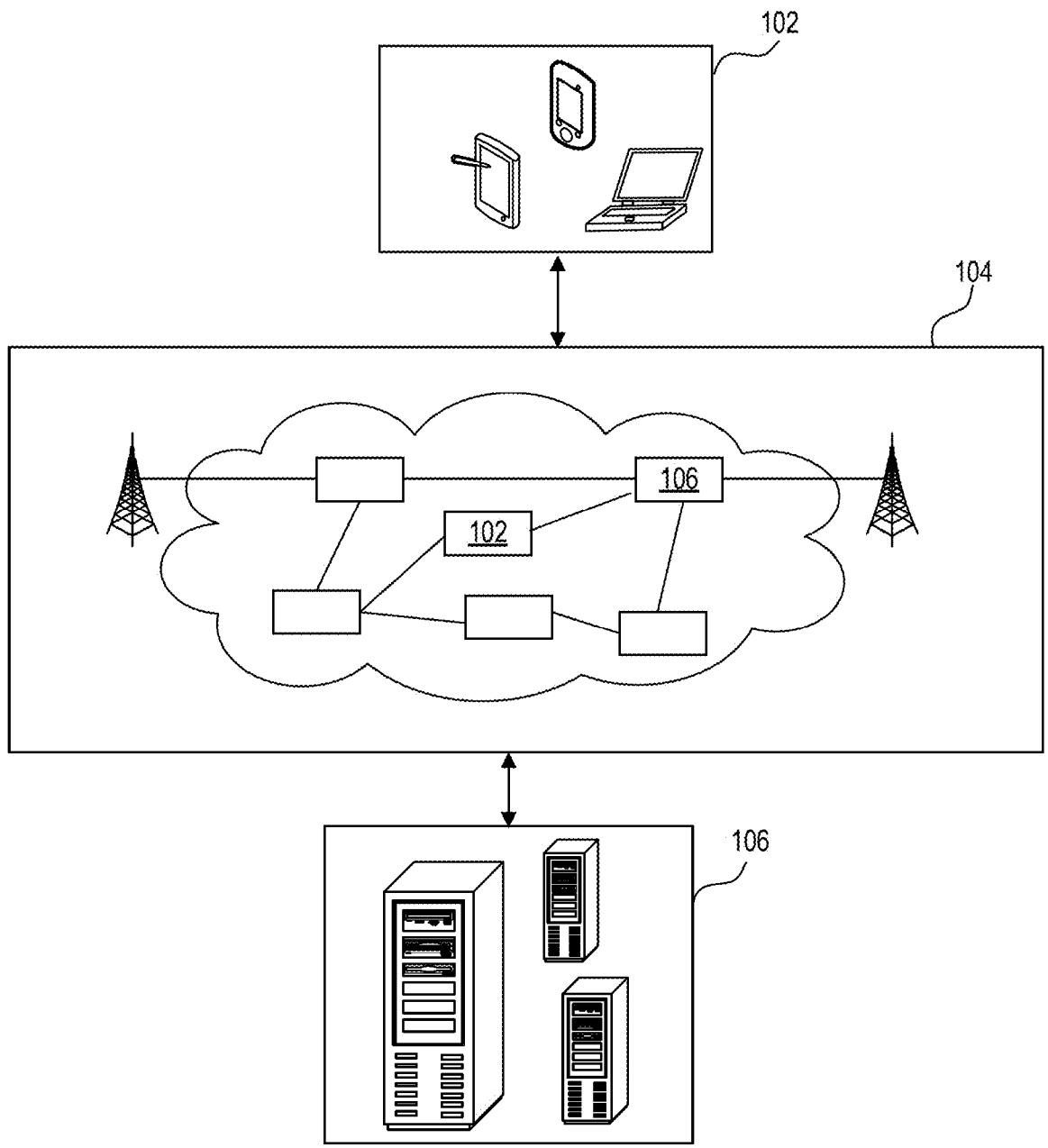
FIG. 1 shows a computing system for generating alternate paths, according to aspects of the present disclosure.

A computing system and methods for generating alternate paths/routes is disclosed. In aspects, the computing system can be used in transportation and logistics applications to locate and/or generate alternate paths/routes to and from destinations. The methods can use customized data structures that can represent the destinations. In aspects, the methods can generate the alternate paths/routes by performing at least the following steps: In aspects, an optimal path to a destination can be identified. Identification of the optimal path can also include locating one or more optimal path nodes, and locating one or more tree edges representing connections between the one or more optimal path nodes.

In some aspects, a path graph can also be generated to facilitate generating the alternate paths/routes. In aspects, the path graph can be generated by generating a dummy node connected to a destination node as an entry point into a graph representing various connections between destination nodes. In aspects, a false edge can be generated indicating a connection from the destination node to the dummy node. In aspects, the dummy node can be assigned as a root node of the path graph. In aspects, an alternate path node on the graph can be located. The alternate path node can connect directly to the destination node or one of the one or more optimal path nodes. In aspects, a sidetrack edge can be located. The sidetrack edge can represent a connection from the alternate path node to the destination node or the one of the one or more optimal path nodes. The identified sidetrack edge can be designated as a child node of the root node of the path graph. In aspects, a detour cost associated with traversing the sidetrack edge to reach the destination node can be identified. The detour cost can be inserted as a variable of the path graph. In aspects, a further alternate path node on the graph can be located. The further alternate path node can connect directly to the alternate path node. In aspects, a further sidetrack edge representing a further connection from the further alternate path node to the alternate path node can be located. The identified further sidetrack edge can be designated as a further child node of the child node. In aspects, a further detour cost associated with traversing the further sidetrack edge to reach the alternate path node can be identified. The further detour cost can be inserted as a further variable of the path graph. In aspects, the computing system can successively repeat the process until all alternate path nodes, further alternate path nodes, sidetrack edges, further sidetrack edges, detour costs, and further detour costs are determined for the graph.

In aspects, the computing system can generate an alternate path sequence based on the path graph. The alternate path sequence can represent an ordered list of alternate paths/routes identified based on the path graph. In aspects, the alternate path sequence can be generated by traversing from the root node of the path graph to the child node. Based on the traversal, the sidetrack edge associated with the child node can be located. In aspects, the computing system can use the information regarding the sidetrack edge to further traverse the graph from the destination node to the located sidetrack edge associated with the child node. In aspects, based on locating the sidetrack edge, the computing system can determine an alternative path is found. In aspects, the computing system can further traverse the graph from the child node to the further child node. In aspects, the further sidetrack edge associated with the further child node can be located. In aspects, the computing system can traverse the graph from the destination node until the located further sidetrack edge associated with the further child node is located on the graph. Based on locating the further sidetrack edge, the computing system can determine a further alternative path is found. In aspects, the computing system can successively repeat the process until all alternative paths and further alternative paths are determined to be found. In aspects, the computing system can further generate an interactive graphical user interface (GUI) for displaying the alternate path sequence. In aspects, the computing system can further transmit the interactive GUI to a display unit for display.

The following aspects are described in sufficient detail to enable those skilled in the art to make and use the disclosure. It is to be understood that other aspects are evident based on the present disclosure, and that system, process, or mechanical changes may be made without departing from the scope of the aspects of the present disclosure.

In the following description, numerous specific details are given to provide a thorough understanding of the disclosure. However, it will be apparent that the disclosure may be practiced without these specific details. In order to avoid obscuring the aspects of the present disclosure, some well-known circuits, system configurations, architectures, and process steps are not disclosed in detail.

The drawings showing the aspects of the system are semi-diagrammatic, and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the disclosures may be operated in any orientation.

The term "module" or "unit" referred to herein may include software, hardware, or a combination thereof in the aspects of the present disclosure in accordance with the context in which the term is used. For example, the software may be machine code, firmware, embedded code, or application software. Also for example, the hardware may be circuitry, a processor, a special purpose computer, an integrated circuit, integrated circuit cores, or a combination thereof. Further, if a module or unit is written in the system or apparatus claims section below, the module or unit is deemed to include hardware circuitry for the purposes and the scope of the system or apparatus claims.

The modules or units in the following description of the aspects may be coupled to one another as described or as shown. The coupling may be direct or indirect, without or with intervening items between coupled modules or units. The coupling may be by physical contact or by communication between modules or units.

System Overview and Function

FIG. 1 shows a computing system 100 for generating alternate paths, according to aspects of the present disclosure. Generating an alternate path (or alternate path generation) as used throughout this disclosure refers to the way in which the computing system 100 determines various paths/routes to and from real-world destinations. In aspects, the real-world destinations may be places, buildings, geographic areas, ports (e.g., airports, seaports, bus terminals), etc. In aspects, in order to determine the various paths/routes to and from these real-world destinations, the computing system 100 can represent the real-world destinations using custom computer-implemented data types and/or data structures. For example, the real-world destinations (e.g., a city, a factory, a port, etc.) may be represented using a data structure. In a preferred aspect, the data structure may be a graph data structure in which each real-world destination may be represented using a vertex (also referred to as a node or a point) in the graph data structure. For example, in instances where the computing system 100 is used in transportation and logistics applications, where it is being used to determine which transportation routes are available to transport goods and/or personnel to and from various real-world destinations, each real-world destination may be represented as a vertex (or node) of the graph data structure. Further, each of the paths/routes may be represented as a link (also referred to as an edge) where each link can represent a connection (or path/route) between a pair of nodes. Using this type of custom data structure, and the various methods described herein in this disclosure, the computing system 100 can perform the alternate path generation to determine the various paths/routes available between the nodes. How the alternate path generation is performed will be described in detail below.

In aspects, the computing system 100 can include a first device 102, such as a client device, connected to a second device 106, such as a server. In aspects, the first device 102 and the second device 106 can communicate with each other through a network 104, such as a wireless or wired network.

The network 104 can span and represent a variety of telecommunication networks and network topologies. For example, the network 104 can include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the network 104. Cable, Ethernet, digital subscriber line (DSL), fiber optic lines, fiber to the home (FTTH), and plain old telephone service (POTS) are examples of wired communication that may be included in the network 104. Further, the network 104 can traverse a number of network topologies and distances. For example, the network 104 can include direct connection, personal area network (PAN), local area network (LAN), metropolitan area network (MAN), wide area network (WAN), or a combination thereof.

In aspects, the first device 102, may be any variety of devices, such as a smart phone, a cellular phone, a personal digital assistant, a tablet computer, a notebook computer, a laptop computer, or a desktop computer. In aspects, the first device 102 can couple, either directly or indirectly, to the network 104 to communicate with the second device 106 or may be a stand-alone device.

In aspects, the second device 106 may be any variety of centralized or decentralized computing devices. For example, the second device 106 may be a laptop computer, a desktop computer, grid-computing resources, a virtualized computing resource, cloud computing resources, routers, switches, peer-to-peer distributed computing devices, a server, a server farm, or a combination thereof. In aspects, the second device 106 may be centralized in a single room, distributed across different rooms, distributed across different geographic locations, or embedded within the network 104. In aspects, the second device 106 can couple with the network 104 to communicate with the first device 102 or may be a stand-alone device.

For illustrative purposes, the computing system 100 is shown with the first device 102 and the second device 106 as end points of the network 104, although it is understood that the computing system 100 can have a different partition between the first device 102, the second device 106, and the network 104. For example, the first device 102 and the second device 106 can also function as part of the network 104.

Figure 2:
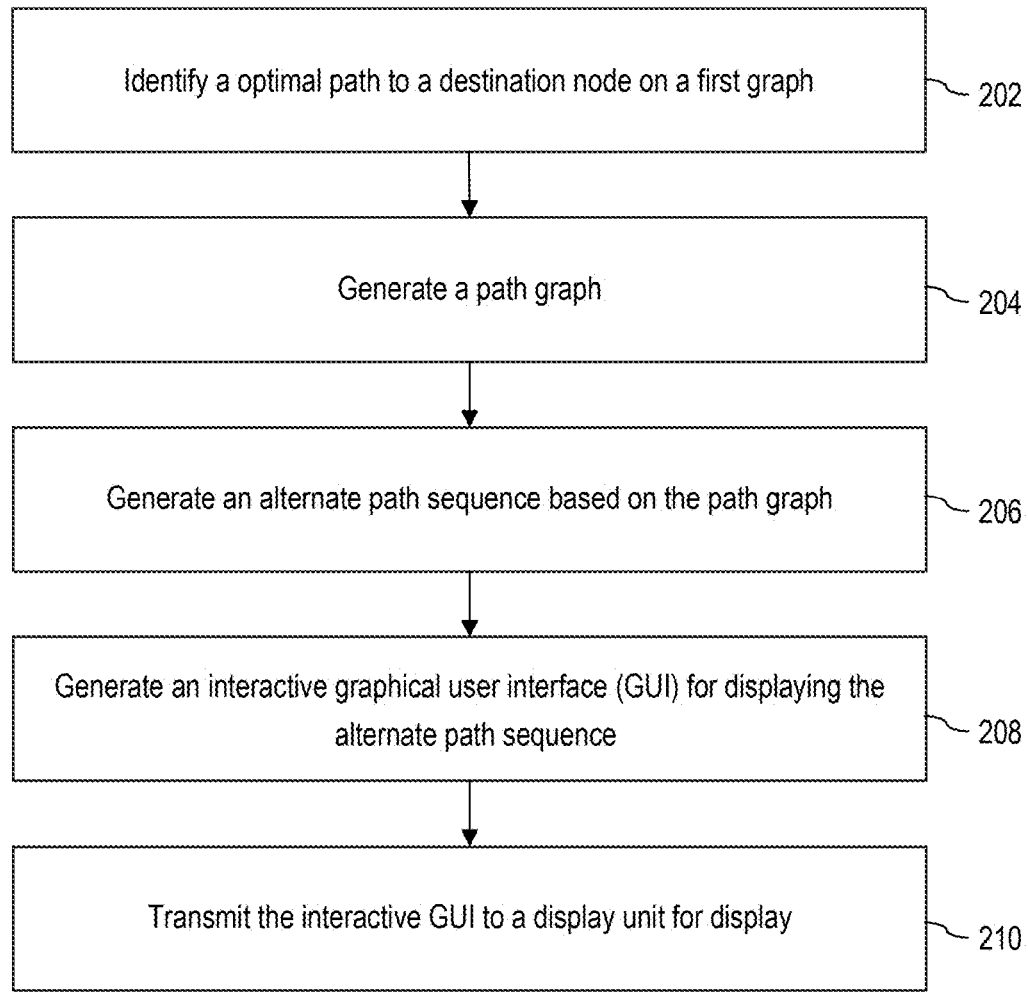
FIG. 2 shows a method of operating the computing system for generating alternate paths, according to aspects of the present disclosure.

FIG. 2 shows a method 200 of operating the computing system 100 for generating alternate paths, according to aspects of the present disclosure. In aspects, method 200 may be performed on either of the first device 102 or the second device 106. In aspects, portions of method 200 may be performed on the first device 102 and/or the second device 106. For the purposes of discussion with respect to FIG. 2, and throughout the rest of this disclosure, it is assumed the steps of method 200 are performed on the second device 106. In aspects, method 200 may be performed using software modules. In aspects, instructions (e.g., source code) stored on a non-transitory computer readable medium on the second device 106 may be executed to cause any hardware units of the second device 106, such as a processor, to process the stored instructions to have the software modules perform the functions of method 200.

In aspects, method 200 may be performed based on the following steps. In step 202, an optimal path 306 (shown in FIG. 3B) may be identified. The optimal path 306 can represent the fastest and/or least costly path/route to a destination node 308 (shown in FIG. 3B). In aspects, "cost" can refer to either a time cost, monetary cost, a distance, or a combination thereof, such that "least costly" refers to a lowest monetary cost it takes to take a path/route to a destination node 308, and/or "least costly" can refer to a quickest (in terms of time) path/route to the destination node 308, and/or "least costly" can refer to a shortest distance traversed to the destination node 308, or a combination thereof. In aspects, the destination node 308 can represent a real-world destination that can serve as a terminal point for a path/route from a starting node 310 (shown in FIG. 3B).

In aspects, and as shown in step 204, based on determining the optimal path 306 to the destination node 308, a path graph 440 (as shown in FIGS. 4C-4G) may be generated. How the path graph 440 is generated will be described with respect to FIGS. 4A-4G below. In aspects, the path graph 440 may be implemented and stored as a heap data structure. A person of ordinary skill in the art (POSA) will recognize that a heap data structure refers to a specialized computer implemented tree-based data structure. In aspects, the heap data structure may be implemented as an array, where each element in the array represents a node of the heap data structure, and the parent/child relationship between each element is defined implicitly by the elements' indices in the array. In aspects, the path graph 440 may be an intermediary data structure that may be used to facilitate the determination of the alternate paths/routes to the destination node 308. In aspects, the path graph 440 can also store information regarding the cost of taking the alternate paths/routes. The path graph 440 will be described in further detail below.

Figure 5A:
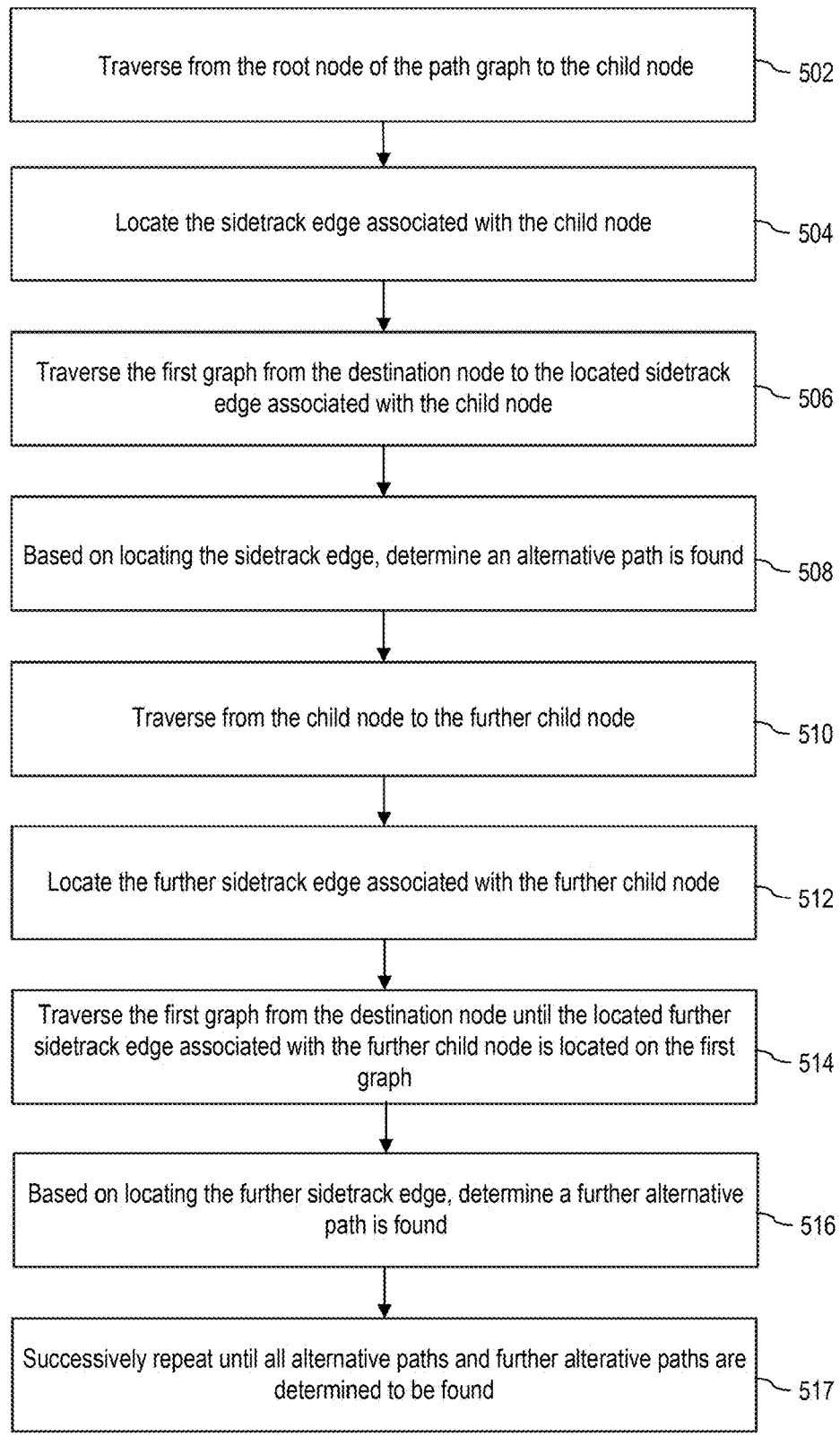
FIG. 5A shows a method of operating the computing system to generate an alternate path sequence, according to aspects of the present disclosure.
Figure 5B:
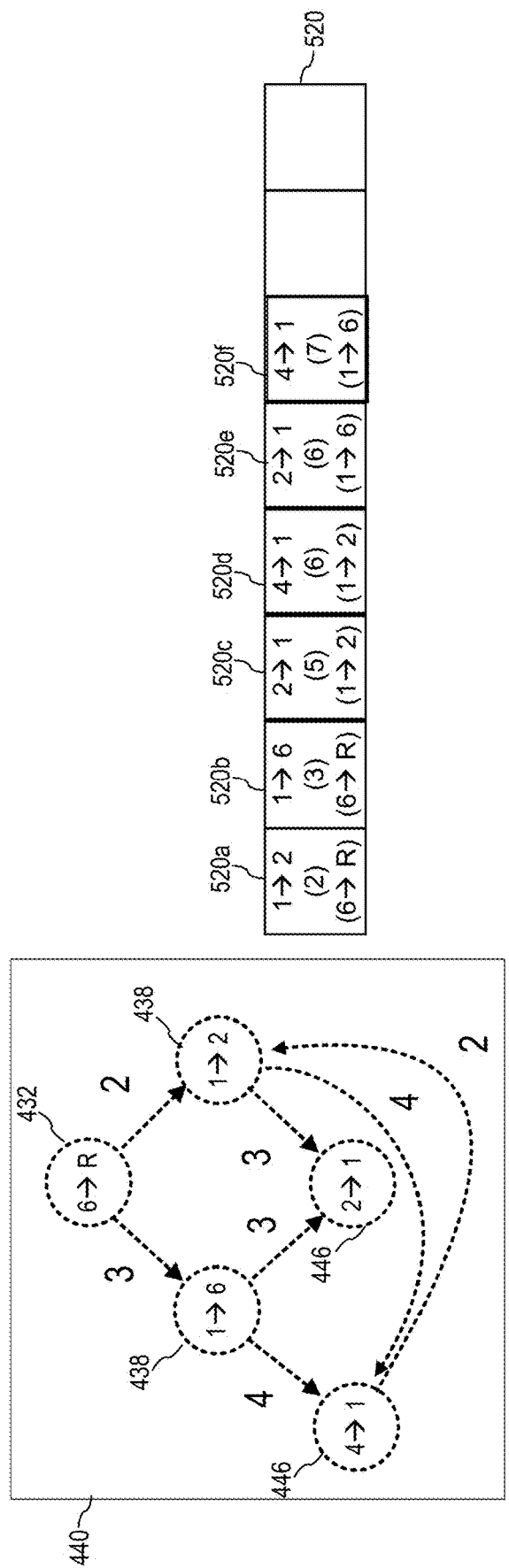
FIGS. 5B-5E show graphical illustrations of how the method of FIG. 5A is performed, according to aspects of the present disclosure.
Figure 5C:
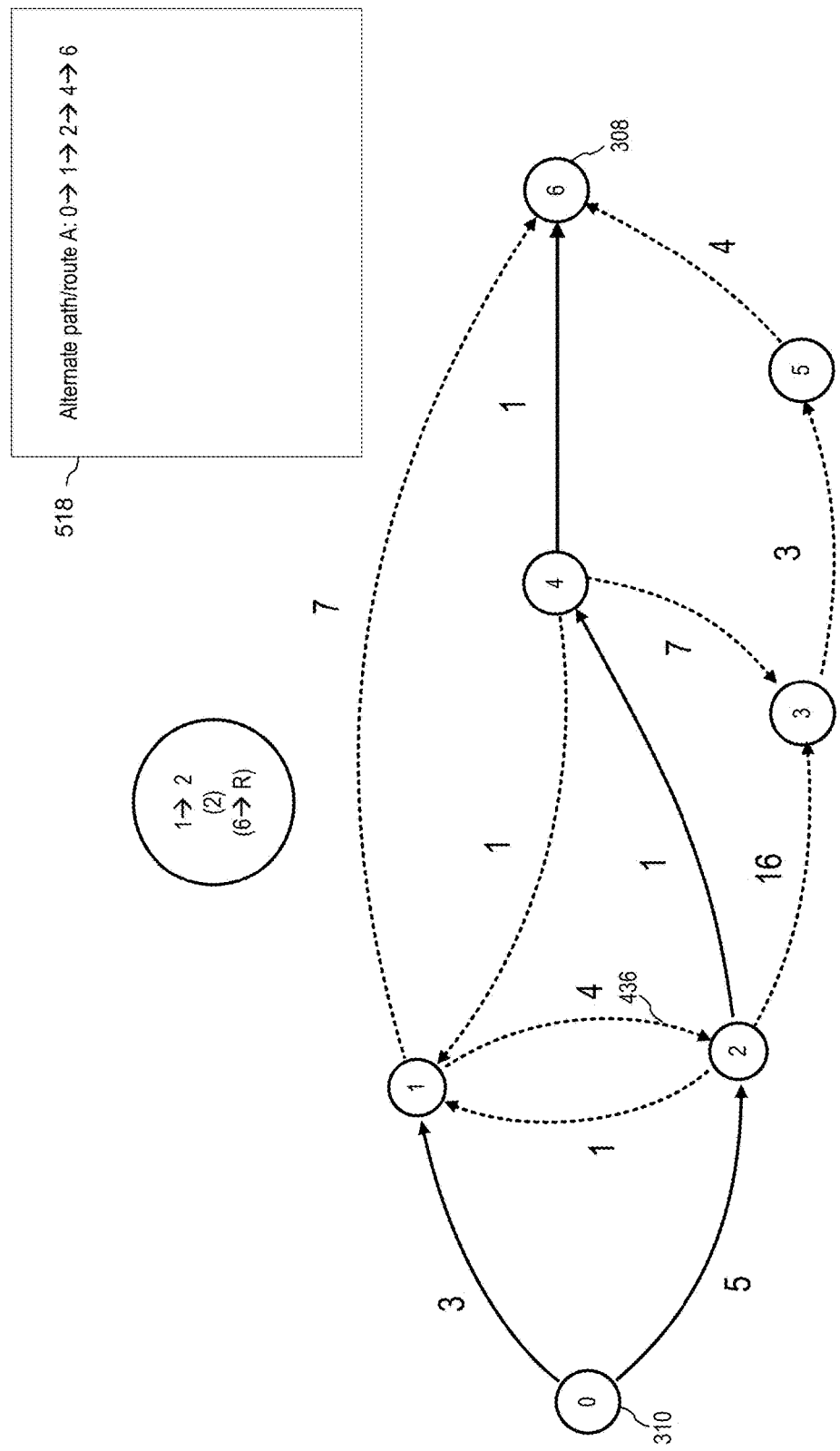
Figure 5D:
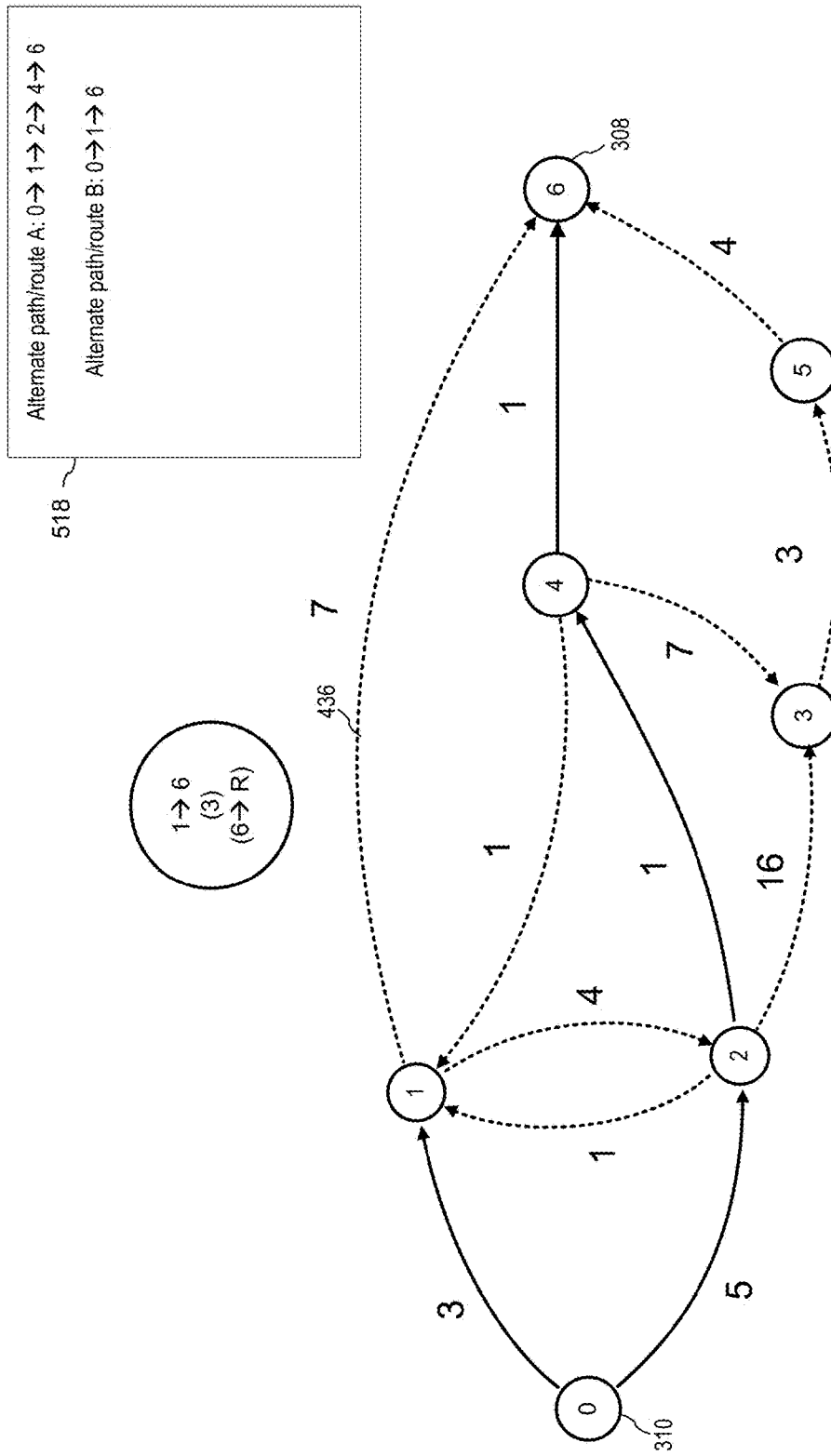
Figure 5E:
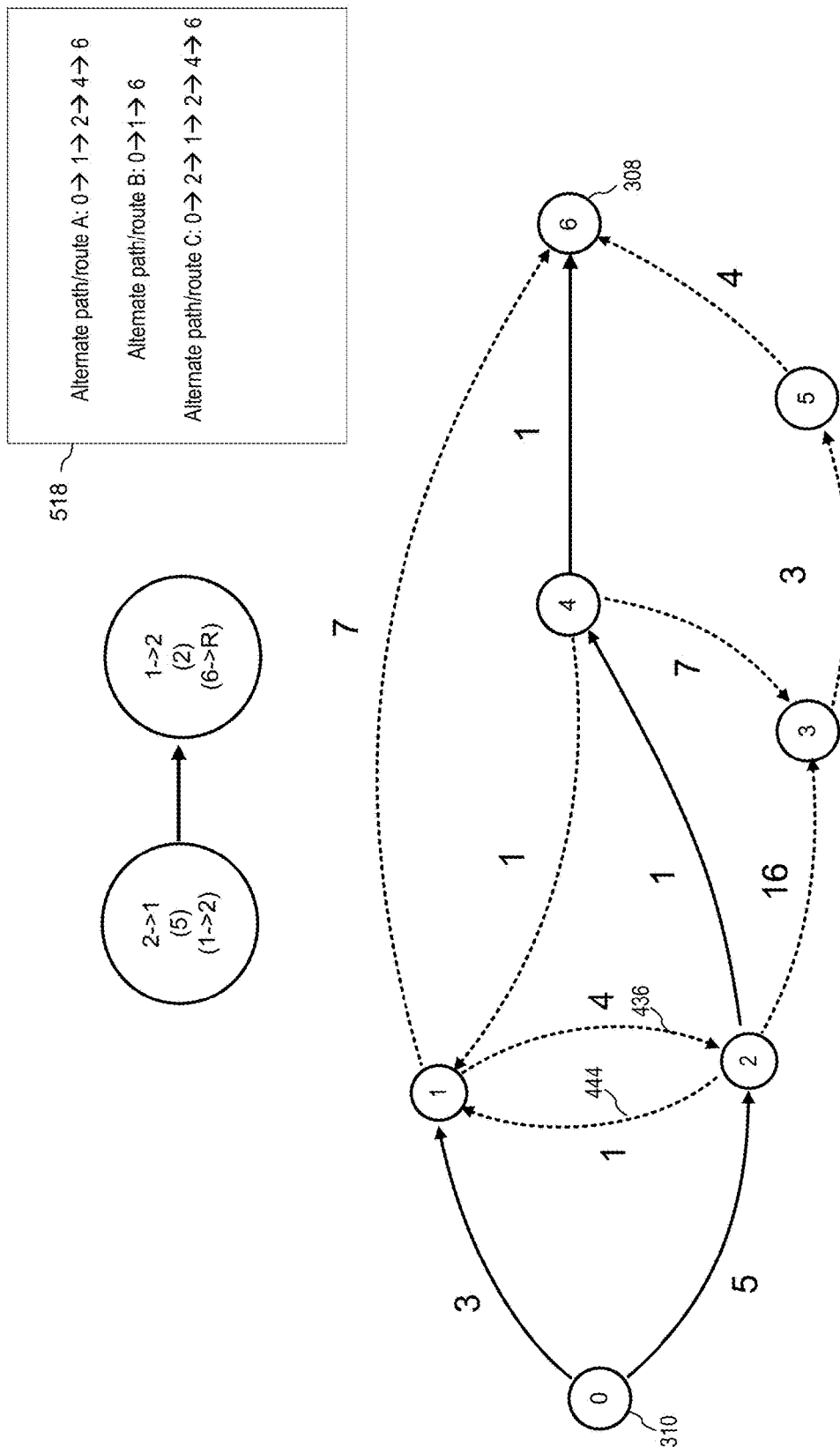

In aspects, and as shown in step 206, an alternate path sequence 518 (as shown in FIGS. 5C-5E) may be generated based on the path graph 440. In aspects, the alternate path sequence 518 can represent an ordered sequence of the alternate paths/routes of the path graph 440. For example, in aspects, the alternate path sequence 518 can represent the alternate paths/routes of the path graph 440 in a particular order. In aspects, the particular order may be, for example, a sequence indicating a shortest time to a longest time associated with taking the alternate paths/routes. In aspects, the particular order can indicate a monetary cost associated with taking an alternate path/route (e.g., the least costly to most costly alternate paths/routes).

Figure 7:
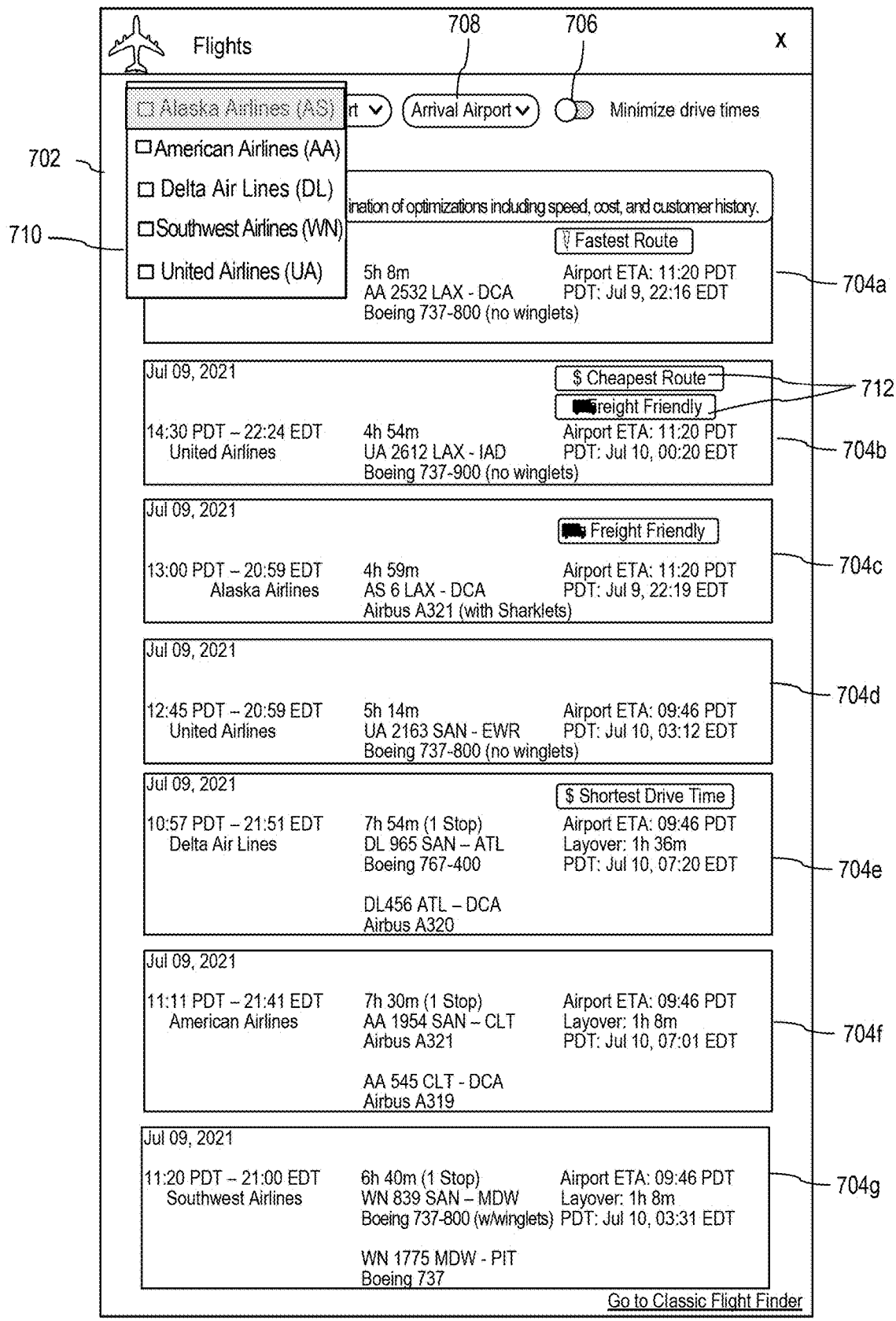
Figure 8:
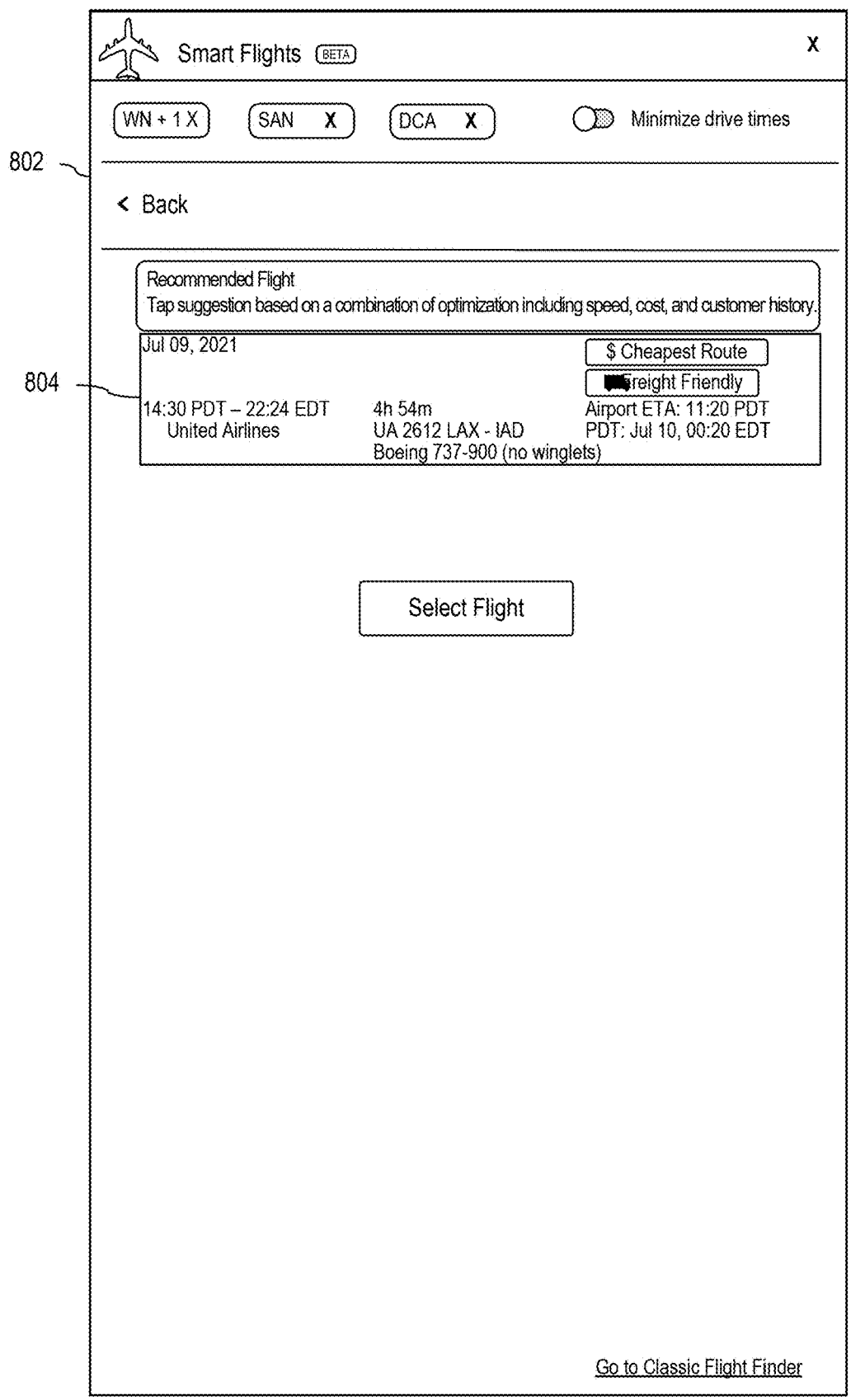
Figure 9:
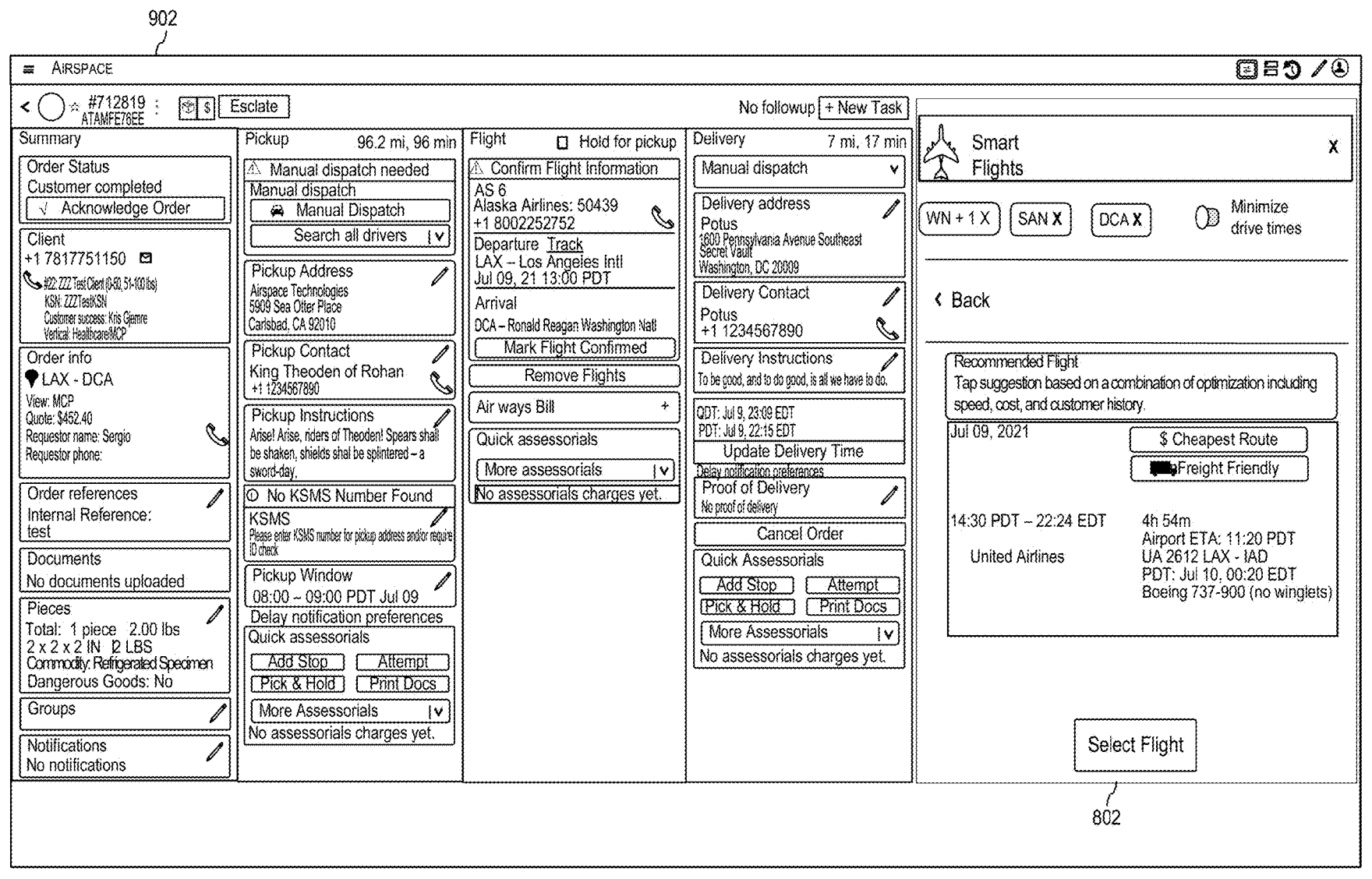

In aspects, and as shown in step 208, the computing system 100 can further generate interactive graphical user interfaces (GUIs) (as shown in FIGS. 7-9) for displaying the alternate path sequence 518. In aspects, and as shown in step 210, the computing system 100 can transmit the interactive GUIs for display on a further device. For example, in aspects, the transmission may be to the first device 102, for display on a screen, monitor, or other display unit of the first device 102.

Figure 3A:
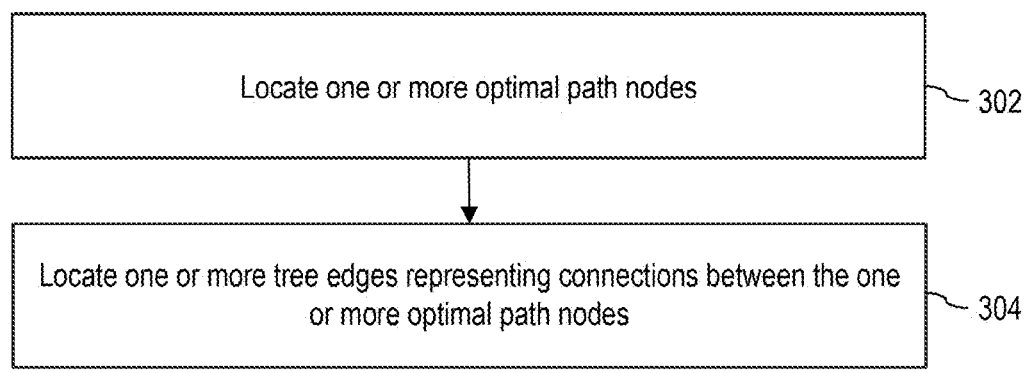
FIG. 3A shows a method of operating the computing system to identify an optimal path to a destination node in order to facilitate generating alternate paths, according to aspects of the present disclosure.
Figure 3B:
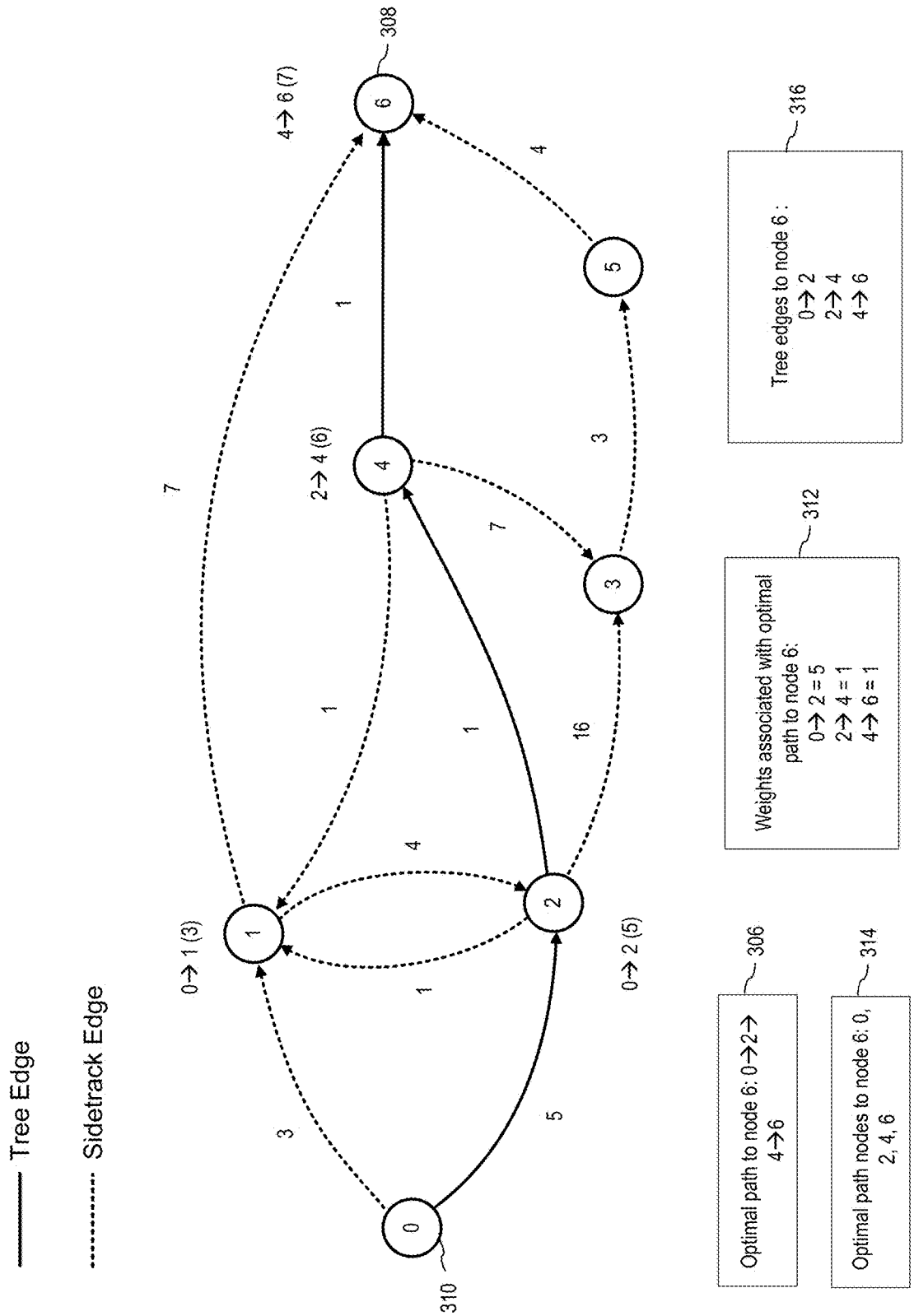
FIG. 3B shows a graphical illustration of how the method of FIG. 3A is performed, according to aspects of the present disclosure.

FIG. 3A shows a method 300 of operating the computing system 100 to identify an optimal path 306 (shown in FIG. 3B) to a destination node 308 (shown in FIG. 3B) in order to facilitate generating alternate paths, according to aspects of the present disclosure. FIG. 3B shows a graphical illustration of how method 300 is performed, according to aspects of the present disclosure. FIGS. 3A and 3B provide further details of how step 202 of FIG. 2 is performed.

In aspects, the computing system 100 can determine the optimal path 306 to the destination node 308 by first identifying the destination node 308. An exemplary graph is shown in FIG. 3B with various nodes and edges representing connections between pairs of nodes. In aspects, the destination node 308 may be any of the nodes on the graph. For the purposes of FIG. 3B, the destination node 308 is shown as node 6. This, however, is exemplary and any other node may be identified as the destination node 308. For the purposes of discussion throughout this disclosure it will be assumed that node 6 is the destination node 308.

In aspects, selection of the destination node 308 may be based on a user input. For example, a user of the computing system 100 can select a real-world destination, which he or she wants to know all the paths/routes to. In aspects, the real-world destination, as represented by a node on the graph, may be selected as the destination node 308.

In aspects, the optimal path 306 can represent the fastest (time-wise), shortest distance, and/or least expensive path/route to the destination node 308. For example, in aspects, the optimal path 306 can represent the path/route that takes the least amount of time to get to the destination node 308, and/or can represent the path/route with the least associated monetary cost to get to the destination node 308. In aspects, the time and/or cost associated with a path/route may be represented as a weight 312 or an aggregated sum of each weight 312 along each edge of the graph. In FIG. 3B, each weight 312 associated with an edge connecting two nodes is shown as a numerical value along each edge of the graph. For example, the weight 312 associated with traversing node 0 to node 1 is shown as "3." Also, the weight 312 associated with traversing node 0 to node 2 is shown as "5." Also, the weight 312 associated with traversing nodes 0→2→4→6 is "7," which is the aggregated sum of each weight 312 along each edge connecting nodes 0, 2, 4, and 6. While each weight 312 of FIG. 3B is shown as a positive integer, this is exemplary. In aspects, other values may be used to represent each weight 312. For example, a real number may be used to represent each weight 312. How each weight 312 is determined is beyond the scope of this disclosure. For the purposes of discussion, it is assumed that a weight 312 exists for each edge connecting a pair of nodes.

In aspects, in order to identify the optimal path 306, the computing system 100 must locate one or more optimal path nodes 314 (shown in FIG. 3B), and one or more tree edges 316 (shown in FIG. 3B) representing connections between the one or more optimal path nodes 314. These steps are shown as steps 302 and 304 of FIG. 3A. In aspects, the one or more optimal path nodes 314 refer to each node along the optimal path 306 to the destination node 308. By way of example, if the destination node 308 is node 6, based on each weight 312 shown in FIG. 3B, the optimal path 306 to node 6 from a starting node 310, for example node 0, is via traversal of the path/route consisting of nodes 0→2→4→6. In aspects, this may be determined by aggregating each weight 312 along each edge from node 0 to node 6, and determining which of the aggregated weights sums to the lowest number. For example the path/route consisting of nodes 0→2→4→6 has an aggregated sum of each weight 312 along each edge resulting in an aggregated sum of "7." However, if the path/route consisting of nodes 0→2→3→5→6 is used, the total aggregated sum of each weight 312 along that path/route is "28." Alternatively, if the path/route consisting of nodes 0→1→2→4→6 is taken the total aggregated sum of each weight 312 along that path/route is "9." Thus, based on traversing all the paths/routes from node 0 to node 6 and comparing all the aggregated sums of weights for each edge along each of the paths/routes, it may be determined that the path/route consisting of nodes 0→2→4→6 has the lowest total weight 312, and is therefore the optimal path 306 to node 6. In aspects, the aforementioned process may be used to determine the optimal path 306 to any node shown in FIG. 3B.

In aspects, once the optimal path 306 is determined and/or located, the one or more tree edges 316 can also be determined as representing connections or links between the one or more optimal path nodes 314. For example, and taking the example of path/route 0→2→4→6 representing the optimal path 306 to node 6, the one or more optimal path nodes 314 will be nodes 0, 2, 4, and 6. As a result, the one or more tree edges 316 can also be determined to be each edge connecting nodes 0→2, nodes 2→4, and nodes 4→6.

In aspects, the optimal path 306 may be identified using one of a variety of optimal path algorithms. For example, in aspects, either of Dijkstra's algorithm or A* algorithm may be used to determine the optimal path 306. A POSA will recognize how to implement such algorithms to determine the optimal path 306.

In aspects, once the optimal path 306, the one or more optimal path nodes 314, and the one or more tree edges 316, are identified and/or located, the computing system 100 can pass control and the information to further modules to generate a path graph 440 (shown in FIGS. 4C-4G) based on the information. In aspects, the path graph 440 may be used to facilitate generating alternate paths.

Figure 4A:
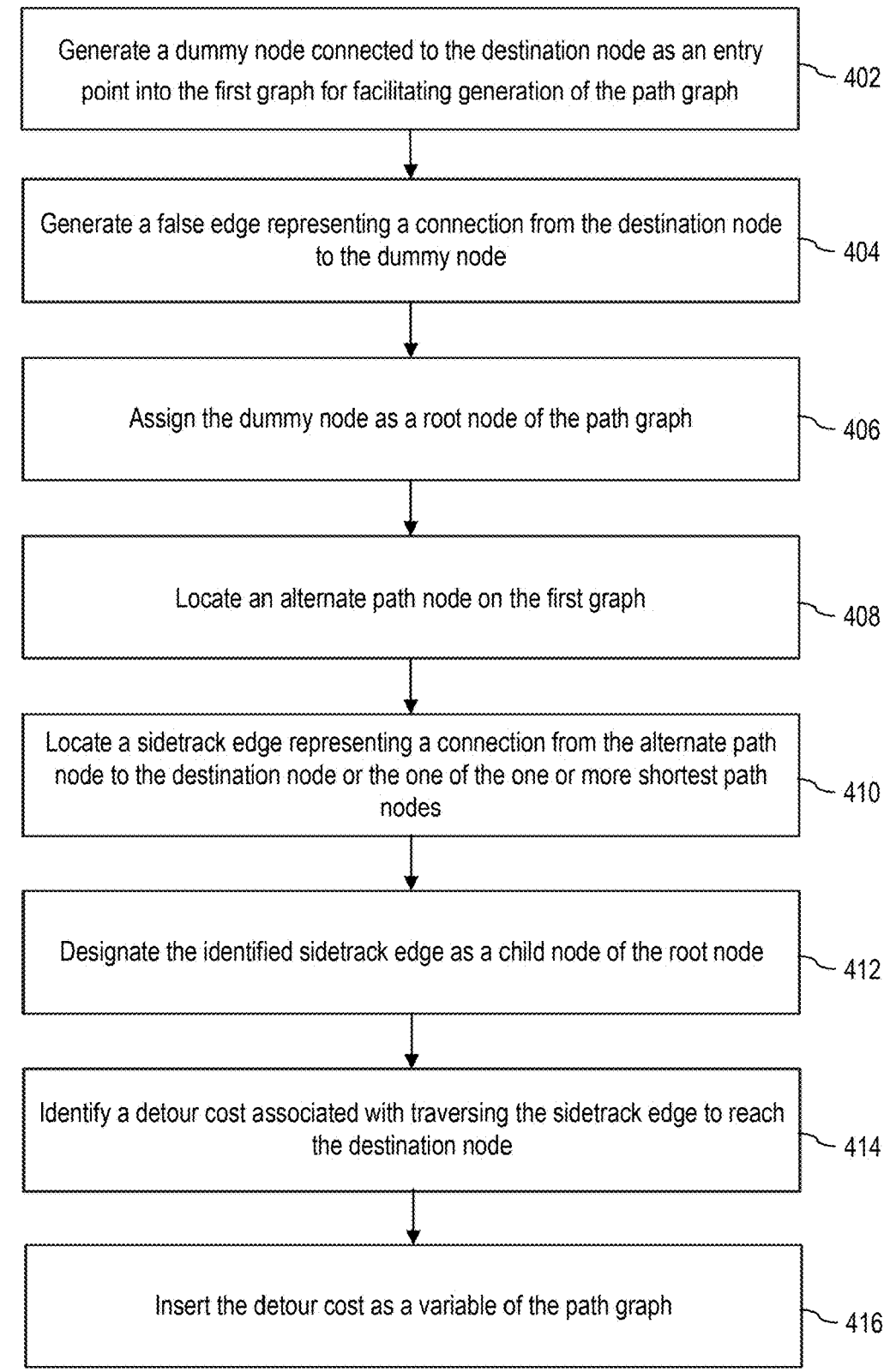
FIGS. 4A and 4B show methods of operating the computing system to generate a path graph to facilitate generating alternate paths, according to aspects of the present disclosure.
Figure 4B:
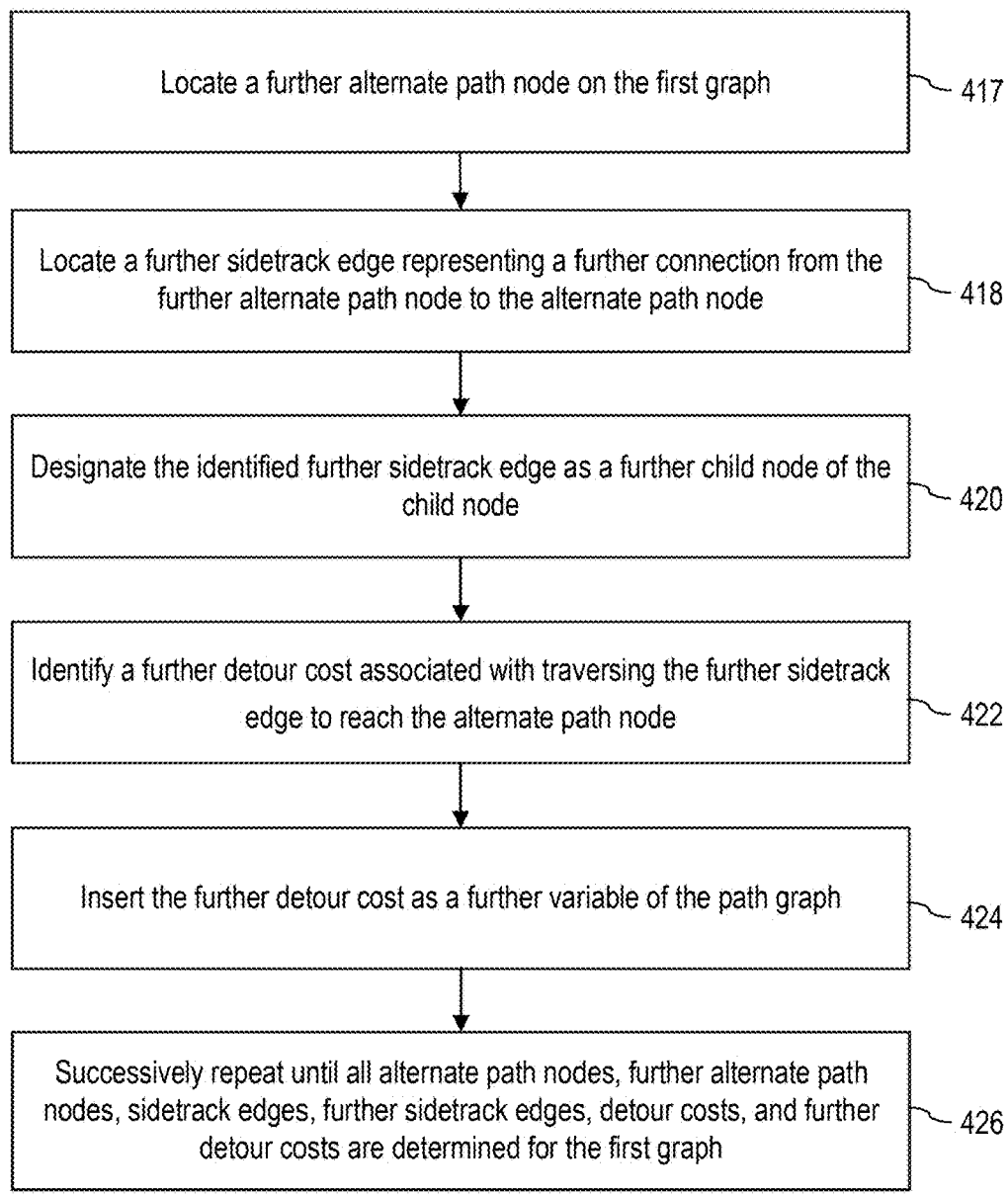

FIGS. 4A and 4B show methods 400 and 401 of operating the computing system 100 to generate a path graph 440 to facilitate generating alternate paths, according to aspects of the present disclosure. FIGS. 4C-4G show graphical illustrations of how methods 400 and 401 are performed, according to aspects of the present disclosure. FIGS. 4A-4G provide further details of how step 204 of FIG. 2 is performed.

In aspects, the computing system 100 can generate the path graph 440 by using the exemplary graph shown in FIG. 3B (also shown in FIGS. 4C-4G) to determine which alternate paths/routes are available to take to the destination node 308. Again, for the purposes of discussion with respect to FIGS. 4A-4G, it is assumed the destination node 308 is node 6. In aspects, the computing system 100 can further determine the cost associated with traversing each of the alternate paths/routes to the destination node 308. How the cost is determined will be explained further below.

In aspects, and as shown in step 402 of FIG. 4A, the computing system 100 may begin generating the path graph 440 by first generating a dummy node 428 (shown in FIG. 4C) which may be connected to the destination node 308 as an entry point into the graph. In aspects, the dummy node 428 refers to a node indicating a fake or false representation of a real-world destination. The purpose of generating the dummy node 428 is to set a starting/entry point for the computing system 100 to begin determining the alternate paths/routes to the destination node 308.

In aspects, and as shown in step 404 of FIG. 4A, a false edge 430 (shown in FIG. 4C) may be generated representing a connection or link from the destination node 308 to the dummy node 428. In this way, the false edge 430 can represent a fake or false representation of a connection between the destination node 308 and the dummy node 428. Again, the purpose of generating the false edge 430 is the same as generating the dummy node 428, which is to set a starting/entry point for the computing system 100 to begin determining the alternate paths/routes to the destination node 308.

In aspects, and as shown in step 406 of FIG. 4A, the computing system 100 can assign the dummy node 428 as a root node 432 (shown in FIG. 4C) of the path graph 440. In aspects, the root node 432 refers to a preliminary or beginning node of the path graph 440. In aspects, the root node 432 can store associated information, which can indicate that, the connection between the dummy node 428 and the destination node 308 (e.g., edge 6→R) is the preliminary or beginning node of the path graph 440.

Figure 4C:
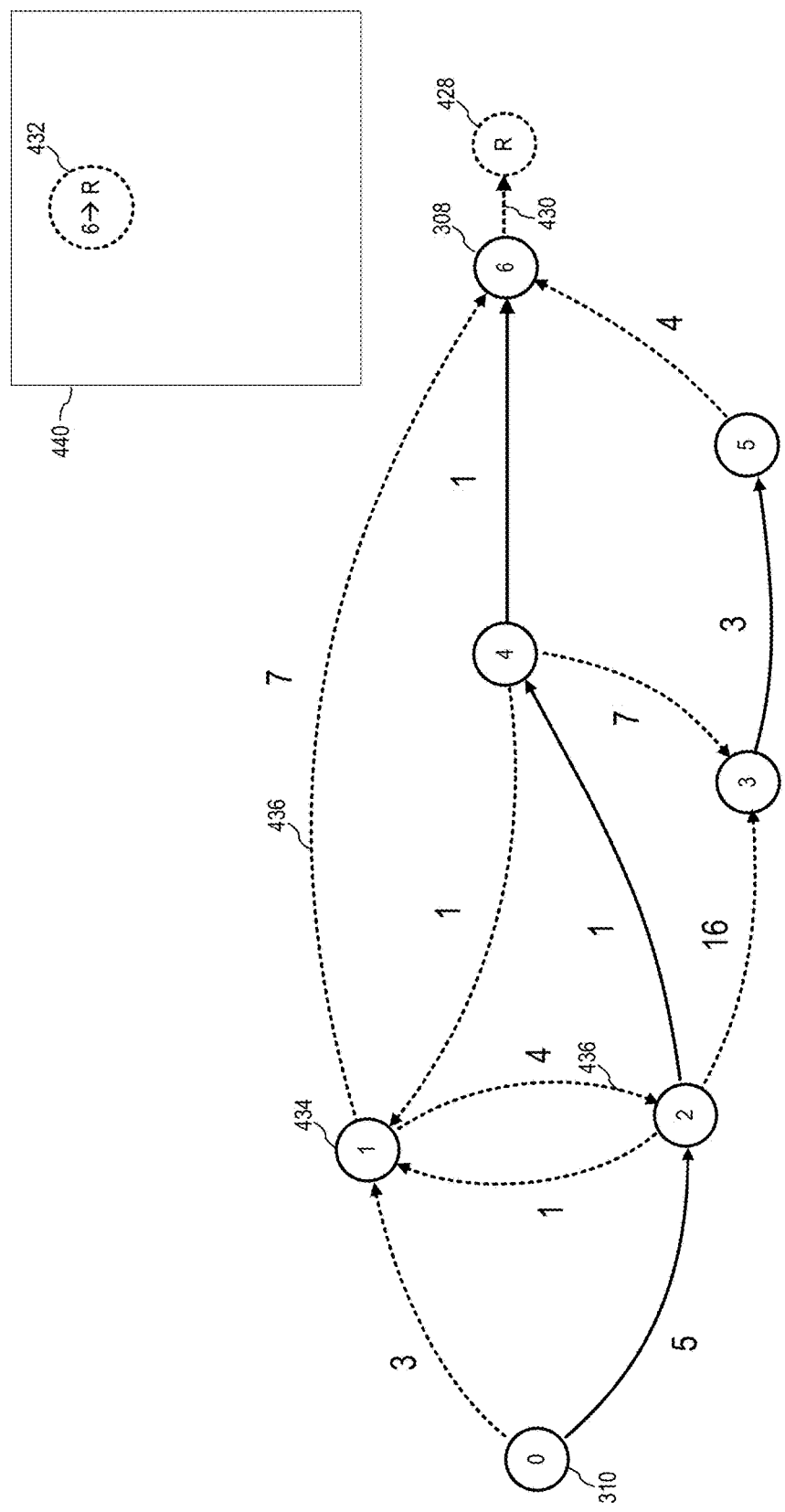
FIGS. 4C-4G show graphical illustrations of how the methods of FIGS. 4A and 4B are performed, according to aspects of the present disclosure.

In aspects, and as shown in step 408 of FIG. 4A, once the root node 432 is assigned, the computing system 100 can locate an alternate path node 434 (as shown in FIG. 4C). The alternate path node 434 may be a node on the graph which either connects directly to the destination node 308 or one of the one or more optimal path nodes 314 (shown in FIG. 3B). In the example given with respect to FIGS. 4C-4G, the alternate path node 434 located is shown as node 1. This is because node 1 matches the criteria of connecting directly to node 6, which is the destination node 308. The purpose of locating the alternate path node 434 is to have the computing system 100 generate the path graph 440 by working backwards from the destination node 308 to determine all the possible alternate paths/routes and nodes on the graph that may be used to get to the destination node 308.

In aspects, and as shown in step 410 of FIG. 4A, once an alternate path node 434 is located, a sidetrack edge 436 (shown in FIG. 4C) may be located. In aspects, the sidetrack edge 436 can represent a connection from the alternate path node 434 to the destination node 308 or a connection from the alternate path node 434 to one of the one or more optimal path nodes 314. With respect to FIGS. 4C-4G, a sidetrack edge 436 located may be the edge from node 1 to node 6, because it connects the alternate path node 434 (node 1) to the destination node 308 (node 6). Locating the sidetrack edge 436 provides a way for the computing system 100 to determine an alternate path/route that may be taken to the destination node 308. It also allows the computing system 100 the ability to determine a cost associated with taking that sidetrack edge 436 to reach the destination node 308. In aspects, the cost associated with taking the sidetrack edge 436 to reach the destination node 308 may be referred to as a detour cost. How the detour cost is identified will be discussed further below.

Figure 4D:
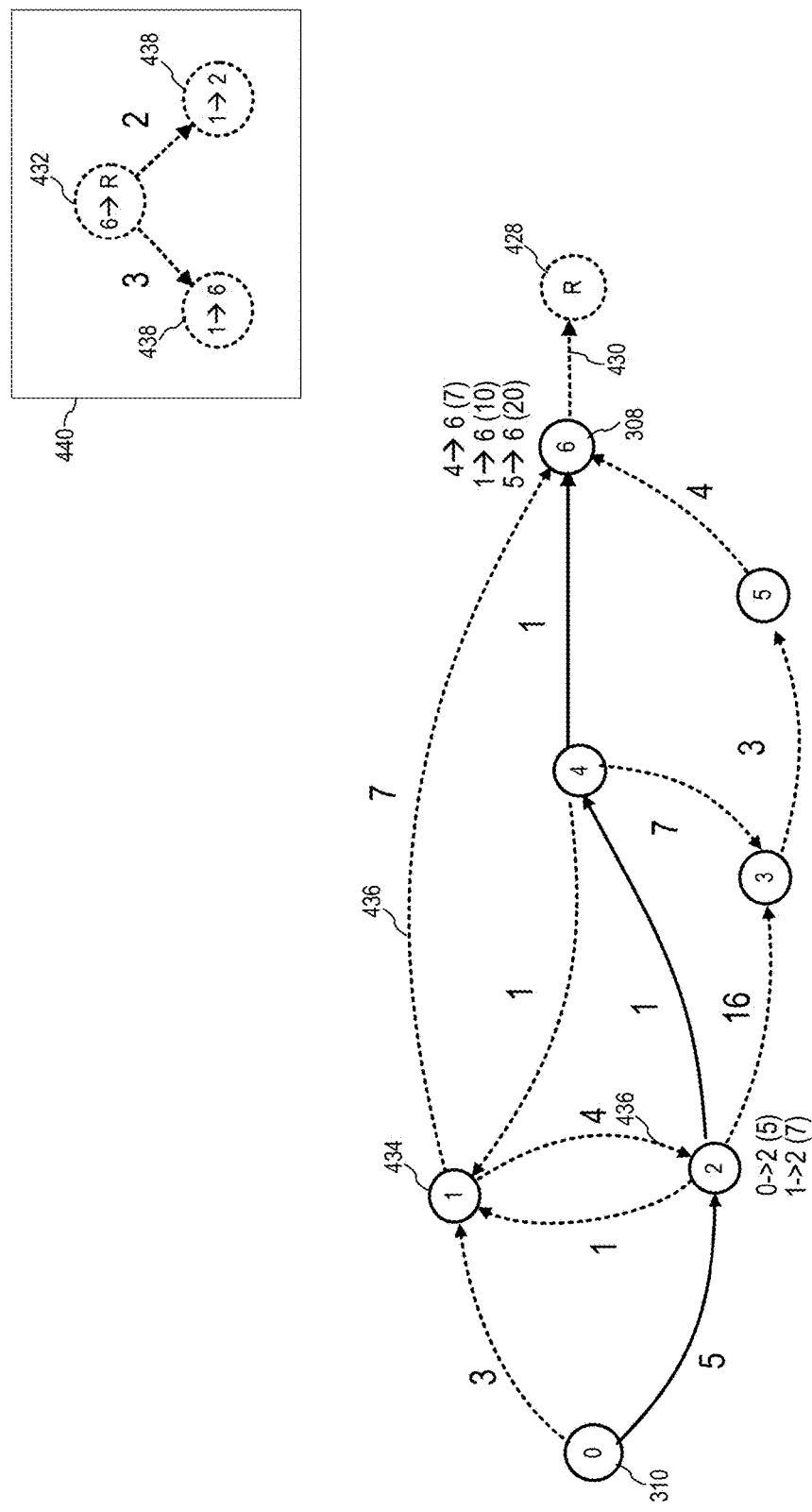

In aspects, and as shown in step 412 of FIG. 4A, once the sidetrack edge 436 is located, the computing system 100 can further generate the path graph 440 by designating the identified sidetrack edge 436 as a child node 438 (as shown in FIG. 4D) of the root node 432 of the path graph 440. The purpose of designating the identified sidetrack edge 436 as the child node 438 is to further generate the path graph 440, and to identify alternative path/route connections to the destination node 308, and represent the same as a data structure that may be operated on by the computing system 100.

In aspects, and as shown in step 414 of FIG. 4A, the computing system 100 can further identify the detour cost associated with traversing the sidetrack edge 436 to reach the destination node 308. In aspects, the detour cost may be identified based on taking the difference between: (i) the aggregate of each weight 312 along the path/route from a starting node 310 to the destination node 308 by taking the sidetrack edge 436, and (ii) the aggregate of each weight 312 along the path/route from a starting node 310 to the destination node 308 by taking the optimal path 306. By way of example, if the starting node 310 is node 0 and if the sidetrack edge 436 connecting nodes 1 and 6 is taken to reach node 6, the aggregate of each weight 312 along the path/route from nodes 0→1→6 is "10." As previously determined, the aggregate of each weight 312 for the optimal path 306 is "7." Thus, in the example where the sidetrack edge 436 from node 1 to node 6 is taken, the detour cost may be determined to be the difference between "10" and "7," which is "3." In other words, the extra cost of taking the sidetrack edge 436 from node 1 to node 6 instead of the optimal path 306 is "3."

In aspects, the computing system 100 can determine the detour cost for any other alternate path node 434 and sidetrack edge 436 identified in the same manner, and designate the identified sidetrack edge 436 as a child node 438 of the root node 432 of the path graph 440. For example, in the exemplary graphs shown in FIGS. 4D-4G, another sidetrack edge 436 that may be located to reach node 6 from node 0 is the edge from node 1 to node 2 (in other words, the alternate path/route consisting of nodes 0→1→2→4→6 may be taken). In aspects, and as shown in FIGS. 4D-4G, the sidetrack edge 436 from node 1 to node 2 can also be designated as a child node 438 of the root node 432 of the path graph 440. In aspects, the detour cost associated with taking the sidetrack edge 436 from node 1 to node 2 can also be determined based on the aforementioned method for determining a detour cost. For example, based on each weight 312 shown in FIGS. 4D-4G, the detour cost for taking the sidetrack edge 436 from node 1 to node 2 to the destination node 308 (i.e., node 6) may be determined to be "2." This is because the aggregated sum of each weight 312 along each edge when taking the path/route consisting of nodes 0→1→2→4→6, (i.e., a route in which the sidetrack edge 436 from node 1 to node 2 is taken to reach node 6) is "9." Thus, taking the difference between "9" and "7" (i.e., the optimal path 306) is "2."

In aspects, and as shown in step 416 of FIG. 4A, once the detour cost is identified and/or determined, it may be inserted as a variable of the path graph 440 (as shown in FIG. 4D). The purpose of inserting the detour cost as a variable of the path graph 440 is to store and indicate the extra cost of taking each sidetrack edge 436. In aspects, this information may be used to identify the relative differences in terms of cost between each alternate path/route identified.

Figure 4E:
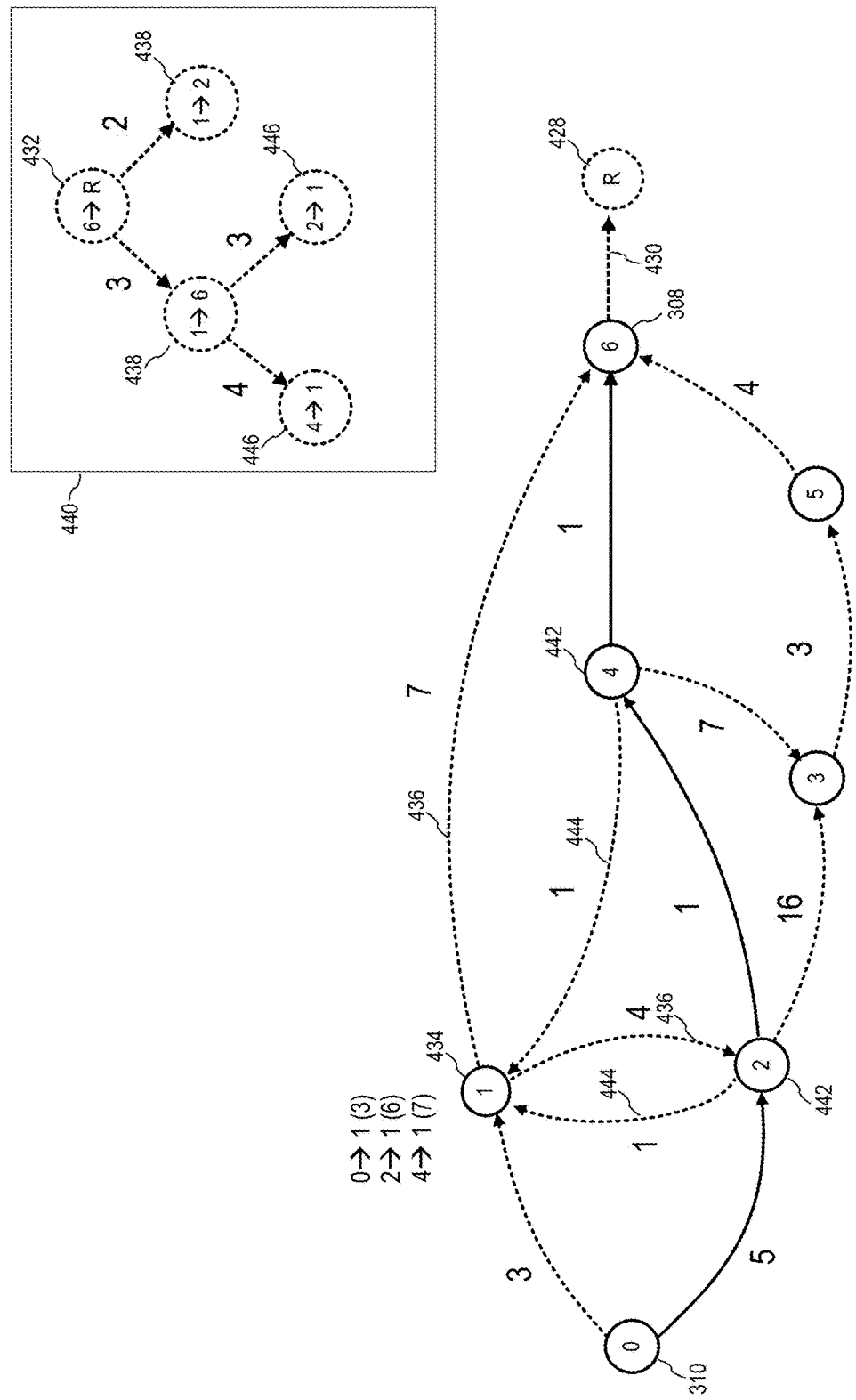

In aspects, and as shown in step 417 of FIG. 4B, once an alternate path node 434, the sidetrack edge 436, and the detour cost is located and/or identified, the computing system 100 can locate a further alternate path node 442 (shown in FIG. 4E). In aspects, the further alternate path node 442 represents a node of the graph that connects directly to the alternate path node 434 and that may be taken to the alternate path node 434. For example, in the exemplary graphs shown in FIGS. 4E-4G, the further alternate path node 442 may be identified to be node 4 connecting directly to node 1. Another example of a further alternate path node 442 may be node 2 connecting directly to node 1. The purpose of locating the further alternate path node 442 is to determine all the nodes on the graph that connect into the alternate path node 434 so that further paths/routes leading into the alternate path node 434 may be determined. In this way, further paths/routes may be discovered and/or located by the computing system 100. It should be noted that the computing system 100 does not have any previous idea or knowledge of where these alternate paths/routes are and so the methods described herein allow the computing system 100 to identify and/or discover these alternate paths/routes by working backwards from the destination node 308.

Continuing with the example, in aspects, and as shown in step 418 of FIG. 4B, once the further alternate path node 442 is located, a further sidetrack edge 444 (shown in FIG. 4E) may be located. In aspects, the further sidetrack edge 444 can represent a connection from the further alternate path node 442 to the alternate path node 434. The purpose of locating the further sidetrack edge 444, similar to the purpose of locating the sidetrack edge 436, is to identify and/or locate further paths/routes into the alternate path node 434 that can ultimately be taken to the destination node 308, and to determine a cost associated with taking that further sidetrack edge 444 to reach the alternate path node 434. The cost associated with taking the further sidetrack edge 444 to reach the alternate path node 434 will be referred to as a further detour cost. How the further detour cost is identified and/or determined will be discussed further below.

In aspects, and as shown in step 420 of FIG. 4B, once the further sidetrack edge 444 is located, the computing system 100 can further generate the path graph 440 by designating the identified further sidetrack edge 444 as a further child node 446 of the child node 438 (shown in FIG. 4E). The purpose of designating the identified further sidetrack edge 444 as the further child node 446 is to further generate the path graph 440 and to identify alternative path/route connections to the alternate path node 434, and represent the same as a data structure that may be operated on by the computing system 100.

In aspects, and as shown in step 422 of FIG. 4B, the computing system 100 can further identify a further detour cost associated with traversing the further sidetrack edge 444 to reach the alternate path node 434. In aspects, the further detour cost may be identified based on taking the difference between: (i) the aggregate of each weight 312 along the path/route from a starting node 310 to the alternate path node 434 by taking the further sidetrack edge 444, and (ii) the aggregate of each weight 312 along the path/route from a starting node 310 to the alternate path node 434 by taking the optimal path 306 to the alternate path node 434. By way of example, and taking the exemplary graphs shown in FIGS. 4E-4G, if the starting node 310 is node 0 and if the further sidetrack edge 444 connecting node 4 to node 1 is taken to reach node 1 (node 1 being an alternate path node 434) from node 0, the aggregated sum of each weight 312 along the path/route (which will be from nodes 0→2→4→1) is equal to "7." From the exemplary graphs shown in FIGS. 4E-4G, it can further be determined that the aggregated sum of each weight 312 to node 1 from the same starting point 310 (node 0) along the optimal path is "3" (because the path will be from node 0→1). Thus, by taking the difference between "7" and "3," the further detour cost may be determined to be "4." In other words, the extra cost of taking the further sidetrack edge 444 from node 4 to node 1 instead of the optimal path 306 to node 1 is "4."

Figure 4F:
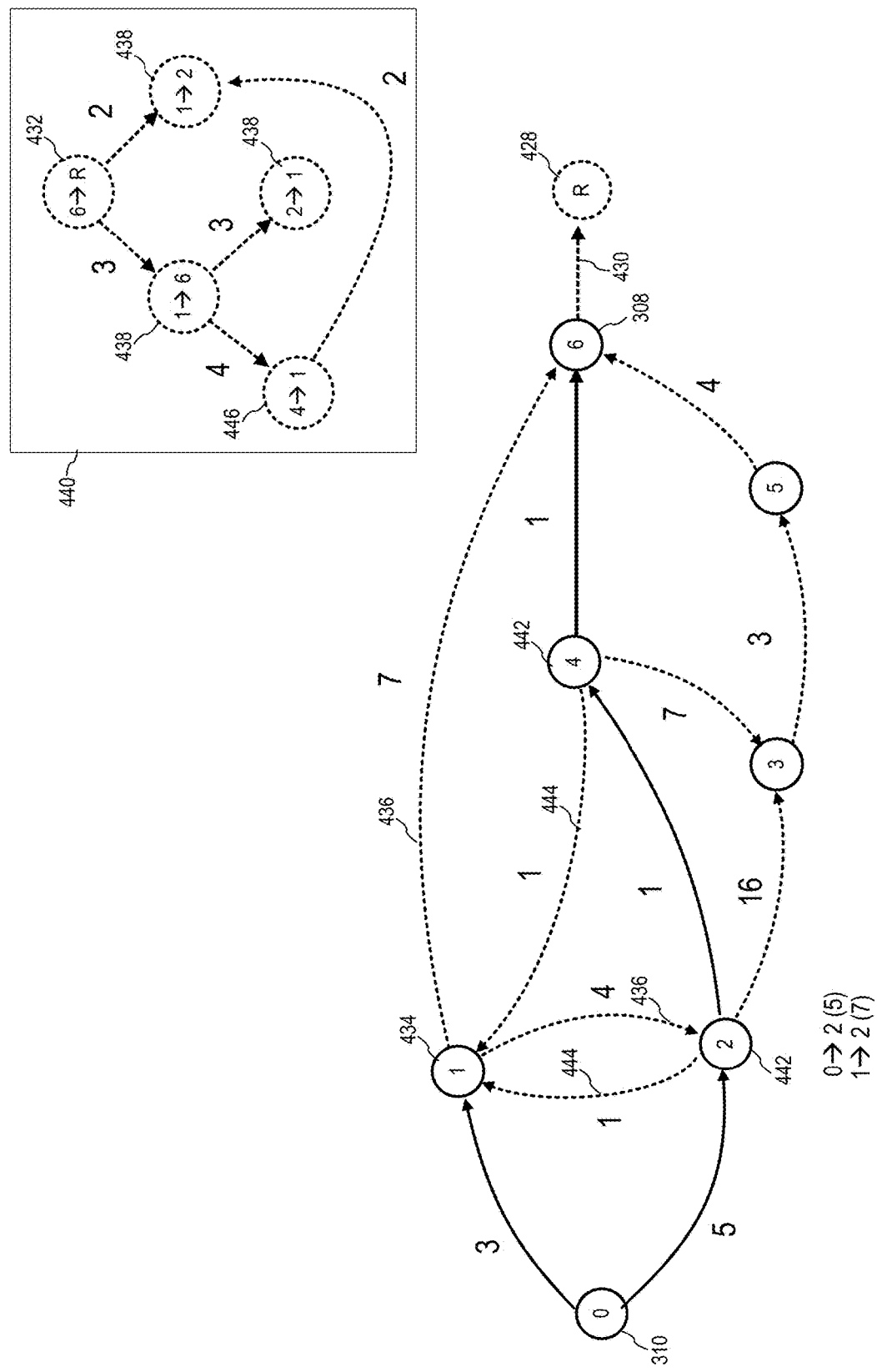
Figure 4G:
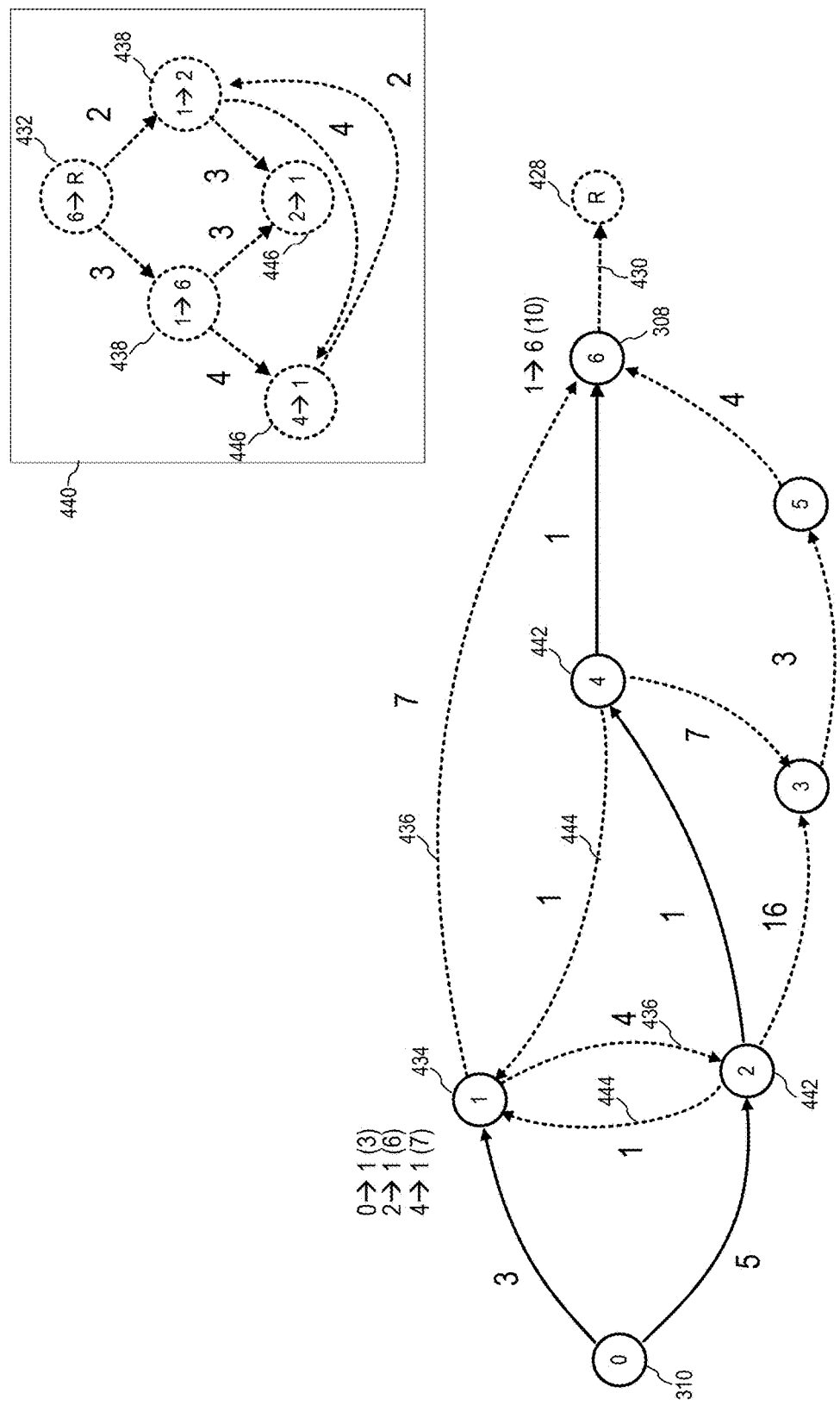

In aspects, the computing system 100 can determine the further detour cost for any other further alternate path node 442 and further sidetrack edge 444 identified in the same manner as described, and designate the identified further sidetrack edge 444 as a further child node 446 of a child node 438 of the path graph 440. For example, in the exemplary graphs shown in FIGS. 4E-4G, another further sidetrack edge 444 that may be located to reach node 1 from node 0 is the edge from node 2 to node 1 (i.e., the alternate path/route from nodes 0→2→1 may be taken). In aspects, and as shown in FIGS. 4E-4G, that further sidetrack edge 444 can also be designated as a further child node 446 of a child node 438 of the path graph 440. In aspects, the further detour cost associated with taking that further sidetrack edge 444 can also be determined based on the aforementioned method for determining a further detour cost. For example, based on each weight 312 shown in FIGS. 4E-4G, the further detour cost for taking the further sidetrack edge 444 from node 2 to node 1 may be determined to be "6." This is because the aggregate of each weight 312 along each edge when taking path/route from nodes 0→2→1 is "6" and taking the difference between "6" and "3" (the aggregated sum of weights for the optimal path 306 to node 1) is "3."

In aspects, and as shown in step 424 of FIG. 4B, once the further detour cost is identified and/or determined it may be inserted as a variable of the path graph 440 (as shown in FIG. 4E). The purpose of inserting the further detour cost as a variable of the path graph 440 is to store and indicate the cost of taking each further sidetrack edge 444 to the alternate path node 434. In aspects, this information may be used to identify the relative differences in terms of cost between each alternate path/route identified to the alternate path node 434.

In aspects, and as shown in step 426 of FIG. 4B, the computing system 100 can successively repeat steps 408, 410, 412, 414, 416, 417, 418, 420, 422, and 424 until all alternate path nodes, further alternate path nodes, sidetrack edges, further sidetrack edges, detour costs, and further detour costs are determined. In this way, a path graph 440 may be generated indicating all alternative paths/routes to and from the destination node 308. In aspects, once step 426 is complete, the path graph 440 is complete. An exemplary complete path graph 440 based on the graphs shown in FIGS. 4C-4G is shown in FIG. 4G.

In aspects, once the complete path graph 440 is generated, the computing system 100 can utilize the path graph 440 to generate an alternate path sequence 518 (as shown in FIGS. 5C-5E). As indicated, in aspects, the alternate path sequence 518 can represent an ordered sequence of the alternate paths/routes of the path graph 440. In aspects, the alternate path sequence 518 may be generated and represented as an ordered list indicating the alternate paths/routes available for a destination node 308 (e.g., node 6).

FIG. 5A shows a method 500 of operating the computing system 100 to generate an alternate path sequence 518, according to aspects of the present disclosure. FIGS. 5B-5E show graphical illustrations of how method 500 is performed, according to aspects of the present disclosure. FIGS. 5A-5E provide further details of how step 206 of FIG. 2 is performed.

In aspects, computing system 100 can generate the alternate path sequence 518 based on the following steps. In aspects, and as shown in step 502 of FIG. 5A, the computing system 100 may begin generating the alternate path sequence 518 by traversing the path graph 440 from the root node 432 (shown in FIG. 5B) to a child node 438 (shown in FIG. 5B). In aspects, to keep an accounting of which nodes of the path graph 440 are being traversed, the computing system 100 can generate a heap data structure 520 and store information associated with the child nodes it traverses in the heap data structure 520.

In aspects, the heap data structure 520 can store information related to the child nodes. For example, the heap data structure 520 can store in its array indices, information regarding each child node 438. In aspects, the information stored can include information related to what edge the node represents (e.g., what sidetrack edge 436 the child node 438 represents), what the cost associated with taking that edge is (e.g., the detour cost), and what node is the parent node of the node (e.g., what node on the path graph 440 is the preceding node that was traversed from to get to the child node 438). This information will be readily available for storage in the heap data structure 520 because it was determined as part of generating the path graph 440. The purpose of storing the information in the heap data structure 520 is to preserve an ordering of the child nodes in relation to their parent nodes. In aspects, the ordering may be done such that the child nodes are saved in the heap data structure 520 from least costly to most costly (in terms of their detour costs). In this way, the computing system 100 can generate the alternate path sequence 518 and order the alternate path sequence 518 from least costly to most costly alternate paths/routes. In aspects, other orderings may be done, for example, from most costly to least costly. This is beneficial when ranking and/or categorizing the alternate paths/routes for later display.

By way of example, and taking the path graph 440 shown in FIG. 5B, the heap data structure 520 may be generated initially with two array indices 520a and 520b. Index 520a represents a traversal from the root node 432 to child node 438 representing the sidetrack edge 436 from node 1 to node 2. In the example, index 520a is shown as storing the detour cost information associated with the sidetrack edge 436 from node 1 to node 2. For example, and as was previously discussed with respect to FIGS. 4A-4G, the detour cost of traversing sidetrack edge 436 from node 1 to node 2 to get to the destination node 308 (node 6) was identified to be "2." Index 520a is also shown as storing information regarding the parent node of the child node 438. In the example shown in FIG. 5B, the parent node is the root node 432.

Similarly, index 520b represents a traversal from the root node 432 to child node 438 representing the sidetrack edge 436 from node 1 to node 6. Index 520b is shown as storing the detour cost associated with taking sidetrack edge 436 from node 1 to node 6, which was previously identified as being "3" in the discussion related to FIGS. 4A-4G. Index 520b is also shown storing information regarding the parent node of the child node 438 for sidetrack edge 436 from node 1 to node 6, which is also the root node 432. As may be seen, the heap data structure 520 shown in FIG. 5B has a particular order. In aspects, this order may be to save the child nodes based on increasing detour cost associated with the sidetrack edge 436 which the child node represents. For example, in the example given in FIG. 5B, the index 520*a* may be seen as having a lower detour cost associated with its sidetrack edge 436 than index 520*b*. Thus, the node representing the sidetrack edge 436 with the lower detour cost (in this case the sidetrack edge 436 associated with taking node 1 to node 2) may be saved first in terms of index position in the heap data structure 520.

In aspects, and as shown in step 504 of FIG. 5A, once the computing system 100 traverses the child node 438, the computing system 100 can identify the sidetrack edge 436 associated with the child node 438. For example, and taking the example shown in FIG. 5B, if the child node 438 is the node representing the sidetrack edge 436 from node 1 to node 2, the computing system 100 can locate the sidetrack edge 436 as being the edge associated with traversing from node 1 to node 2.

In aspects, and as shown in step 506 of FIG. 5A, once the sidetrack edge 436 is located, the computing system 100 can generate the alternate path sequence 518 by traversing the graph previously used to compute the values for the path graph 440 (shown in FIG. 5C—which is the same graph of FIGS. 3B and 4C-4G), from the destination node 308 (node 6) in reverse until the computing system 100 determines that a terminal node of the sidetrack edge 436 is reached. In aspects, the computing system 100 can perform this traversal by taking the one or more tree edges 316 backwards from the destination node 308, until the computing system 100 encounters the terminal node of the sidetrack edge 436. By way of example, and taking the example where the child node 438 represents the sidetrack edge 436 from node 1 to node 2, the computing system 100 can traverse backwards from the destination node 308 (node 6) along the one or more tree edges 316 until node 2 is reached (node 2 being the terminal node of the sidetrack edge 436 because it is the destination of the sidetrack edge 436 from node 1 to node 2). As a result, the traversal will be from nodes 6→4→2.

In aspects, and as shown in step 508 of FIG. 5A, once the terminal node of the sidetrack edge 436 is located, the computing system 100 can determine that it has discovered or found an alternate path/route. In aspects, the alternate path/route found may be the path/route associated with taking that sidetrack edge 436 to the destination node 308. In the case of sidetrack edge 436 from node 1 to node 2, the computing system 100 can determine that it has discovered an alternate path/route that includes the sidetrack edge 436 from node 1 to node 2. In aspects, in order to complete the alternate path/route, the computing system 100 can further continue moving backwards through the graph until it reaches the starting node 310 (e.g., node 0). Thus, in the given example, the computing system 100 can go from nodes 2→1→0. In aspects, once the computing system 100 reaches the starting node 310, the computing system 100 can account for all the nodes it traversed to determine which nodes and edges constitute the alternate path/route it traversed. In aspects, the traversed path/route may be inserted as an alternate path/route of the alternate path sequence 518. FIG. 5C, shows the alternate path sequence 518 listing the alternate path/route discovered based on the aforementioned example, which is the path/route from nodes 0→1→2→4→6.

In aspects, the computing system 100 can continue to traverse the path graph 440 for all child nodes in a similar manner as described, to locate all alternate paths/routes for sidetrack edges associated with those child nodes. For example, taking the example path graph 440 shown in FIG. 5B, the computing system 100 can further identify the sidetrack edge 436 from node 1 to node 6 (which is associated with another child node 438). In aspects, once the computing system 100 identifies the sidetrack edge 436, it can traverse the graph shown in FIG. 5D, until it locates the terminal node associated with that sidetrack edge 436 (node 6), similar to what was described previously with respect to the sidetrack edge from node 1 to node 2. In aspects, once the computing system 100 identifies the terminal node of the sidetrack edge 436 (in this case node 6), it can determined that an alternate path/route has been discovered that includes the sidetrack edge 436 from node 1 to node 6. As shown in FIG. 5D, no other paths/routes needed to be traversed to get to node 6 because node 6 is also the destination node 308. Thus the alternate path/route was only from nodes 6→1. In aspects, in order to complete the alternate path/route, the computing system 100 can further continue moving backwards through the graph until it reaches the starting node 310 (e.g., node 0). Thus, in the given example, the computing system 100 can go from node 1→0. In aspects, once the complete alternate path/route is identified, the alternate path/route may be inserted as an alternate path/route of the alternate path sequence 518. FIG. 5D, shows the alternate path sequence 518 listing the path/route as 0→1→6.

In aspects, and as shown in step 510 of FIG. 5A, the computing system 100 can further generate the alternate path sequence 518 by continuing to traverse the path graph 440 from a child node 438 to a further child node 446. The purpose of performing these additional traversals is to further locate alternate paths/route involving a further sidetrack edge 444 associated with the further child node 446.

In aspects, information related to the further child node 446 may be stored in the heap data structure 520. In the example shown in FIG. 5B, indices 520*c*-520*f* show examples of what information related to the further child node 438 may be stored in the heap data structure 520. By way of example, index 520*c* is shown storing information related to the further child node 446 associated with further sidetrack edge 444 from node 2 to node 1. In aspects, the information related to what edge the further child node 446 represents (e.g., what further sidetrack edge 444 the node represents) may be stored in the heap data structure 520. In aspects, further information stored in the heap data structure 520 can include what the cost associated with taking that edge is (e.g., the detour cost and the further detour cost for taking that further sidetrack edge 444), and the information related to the parent node of the further child node 446 (e.g., what node on the path graph 440 is the preceding node that was traversed from to get to the further child node 446).

With respect to index 520*c*, the parent node of the further child node 446 is shown to be the child node 438 associated with sidetrack edge 436 from node 1 to node 2. Index 520*c* also shows the cost associated with taking the further child node 446 via the child node 438 is "5." This is determined by aggregating the cost from taking the root node 432 (6→R) to child node 438 (1→2) (i.e. the detour cost) which is "2," and the cost from taking the child node 438 (1→2) to the further child node 446 (2→1) (i.e., the further detour cost), which is "3."

Continuing with the example, in aspects, and as shown in step 512 of FIG. 5A, once the computing system 100 traverses from the child node 438 to the further child node 446, the computing system 100 can identify the further sidetrack edge 444 associated with the further child node 446. For example, with respect to FIG. 5B, if the further child node 438 is the node representing the further sidetrack edge 444 from node 2 to node 1, the computing system 100 can locate the further sidetrack edge 444 as being the edge associated with traversing from node 2 to node 1.

In aspects, and as shown in step 514 of FIG. 5A, once the further sidetrack edge 444 is located, the computing system 100 can generate the alternate path sequence 518 by traversing the graph shown in FIG. 5E, from the destination node 308 (e.g., node 6) in reverse until the computing system 100 determines that a terminal node of the further sidetrack edge 444 is reached. In aspects, the computing system 100 can perform this traversal by taking the one or more tree edges 316 backwards from the destination node 308, until the computing system 100 encounters the terminal node of the sidetrack edge 436 associated with the parent node (i.e., the child node 438) of the further child node 446. In the example shown in FIG. 5E, the terminal node is node 2 since it is the terminal node of the sidetrack edge 436 associated with child node 438 from node 1 to node 2. In aspects, once the terminal node is located, the computing system 100 can take that sidetrack edge 436 backwards until it reaches a terminal node of the further sidetrack edge 444. In the example of FIG. 5E this is node 1. Once the computing system 100 locates the terminal node of the further sidetrack edge 444, it can determine that it has discovered a further alternate path/route, and can account for the nodes it has traversed along that path/route. In the example shown in FIG. 5E, that alternate path/route consists of nodes 6→4→2→1.

In aspects, and as shown in step 516 of FIG. 5A, once the terminal node of the further sidetrack edge 444 is located, the computing system 100 can determine that it has discovered or found an alternate path/route. In aspects, the alternate path/route found may be the path/route associated with taking that further sidetrack edge 444 to the destination node 308. In the case of further sidetrack edge 444 from node 2 to node 1, the computing system 100 can determine that it has discovered an alternate path/route that includes the further sidetrack edge 444 from node 2 to node 1. In order to complete the alternate path/route, the computing system 100 can further continue moving backwards through the graph until it reaches the starting node 310 (e.g., node 0). Thus, in the given example, the computing system 100 can go from node 1→2→0. Once the computing system 100 reaches the starting node 310, the computing system 100 can account for all the nodes it traversed to determine which nodes and edges constitute the alternate path/route it traversed. In aspects, the traversed path/route may be inserted as an alternate path/route of the alternate path sequence 518. FIG. 5E, shows the alternate path sequence 518 listing the alternate path/route discovered based on the aforementioned example, which is the path/route from nodes 0→2→1→2→4→6.

In aspects, and as shown in step 517 of FIG. 5A, the computing system 100 can continue to traverse the path graph 440 successively for all further child nodes in a similar manner as described, to locate all alternate paths/routes for sidetrack edges associated with those further child nodes. In this way, all alternate paths/routes and further alternate paths/routes may be determined and/or found. In aspects, upon completing step 517, a complete alternate path sequence 518 is generated.

In aspects, upon completion of the alternate path sequence 518, the computing system 100 can perform further functions using the alternate path sequence 518. For example, in aspects, and as previously described with respect to steps 208 and 210 of FIG. 2, the computing system 100 can further generate interactive graphical user interfaces (GUIs) (as shown in FIGS. 7-9) for displaying the alternate path sequence 518. In aspects, and as shown in step 210, the computing system 100 can transmit the interactive GUIs for display on a further device. For example, in aspects, the transmission may be to the first device 102, for display on a screen, monitor, or other display unit of the first device 102.

In aspects, and based on the methods described above, the computing system 100 may encounter situations in which the computing system 100 may traverse paths/routes infinitely while attempting to discover and/or locate alternative paths. This is particularly true if certain paths are circularly connected. For example, FIG. 5E shows two edges from node 1 to node 2 and from node 2 to node 1, which are circularly connected to one another. In some instances, this may lead to the computing system 100 traversing the nodes in an infinite loop depending on the graph structure. To avoid an infinite looping situation, a safety mechanism may be implemented for the computing system 100 such that the computing system 100 may be limited to traversing edges for a maximum number of iterations (i.e., up to a certain distance), and/or may be limited to traversing edges until a maximum value for the aggregate of the edge weights is achieved for a path/route. For example, in aspects, rules may be set for the computing system 100 that when applying either of Dijkstra's algorithm or A* algorithm, the computing system 100 will only do so for up to a predetermined distance, where the predetermined distance represents a maximum numerical value one or more weights of the tree edges, the sidetrack edges, and the further sidetrack edge can sum to. In aspects, similar rules may be set for any of the steps mentioned with respect to FIG. 2, 3, 4A, 4B, or 5A. In this way, the computing system 100's traversals may be controlled so that meaningful alternate paths/routes are determined and/or located.

It has been discovered that the computing system 100 described above significantly improves the state of the art from conventional systems because it provides a novel way to locate alternate paths/routes using custom data structures (such as graph data structures and heap data structures) that may be used to represent real-world destinations. Conventional systems are typically configured to return an optimal path 306 to a destination. The computing system 100, however, provides a more robust capability in that it can locate many alternate paths/routes to destinations dynamically, in order to give users of the computing system 100 more options when determining what paths/routes are available to real-world destinations. The computing system 100 does this through the novel methods and procedures described above, which when performed provide a fast and efficient way for the computing system 100 to locate the alternate paths/routes.

The computing system 100 also provides a way of leveraging the custom data structures described to significantly improve performance of computers when locating alternate paths/routes. For example, the use of the heap data structure 520 allows the computing system 100 to generate ordered sequences of alternate paths/routes that may be preordered as they are located, thus requiring less processing of the data, when compared to systems that perform ordering as a final step once the alternate paths/routes are determined.

The computing system 100 can also be used to significantly improve industries such as transportation and logistics, where alternate paths/routes need to be determined dynamically based on changing conditions. For example, if certain transportation paths/routes become no longer navigable due to unforeseen circumstances, the computing system 100 may be used to quickly and efficiently locate alternate paths/routes. In this way, disruptions to commercial activities and logistics may be minimized, thus saving companies, individuals, etc. money and time.

The methods 200, 300, 400, 401, and 500 described above may be implemented as instructions stored on a non-transitory computer readable medium to be executed by one or more computing devices, such as a processor, a special purpose computer, an integrated circuit, integrated circuit cores, or a combination thereof. The non-transitory computer readable medium may be implemented with any number of memory units, such as a volatile memory, a nonvolatile memory, an internal memory, an external memory, or a combination thereof. The non-transitory computer readable medium may be integrated as a part of the computing system 100 or installed as a removable portion of the computing system 100. The non-transitory computer readable medium may be integrated as part of the first device 102, the second device 106, or a combination thereof.

Components of the System

Figure 6:
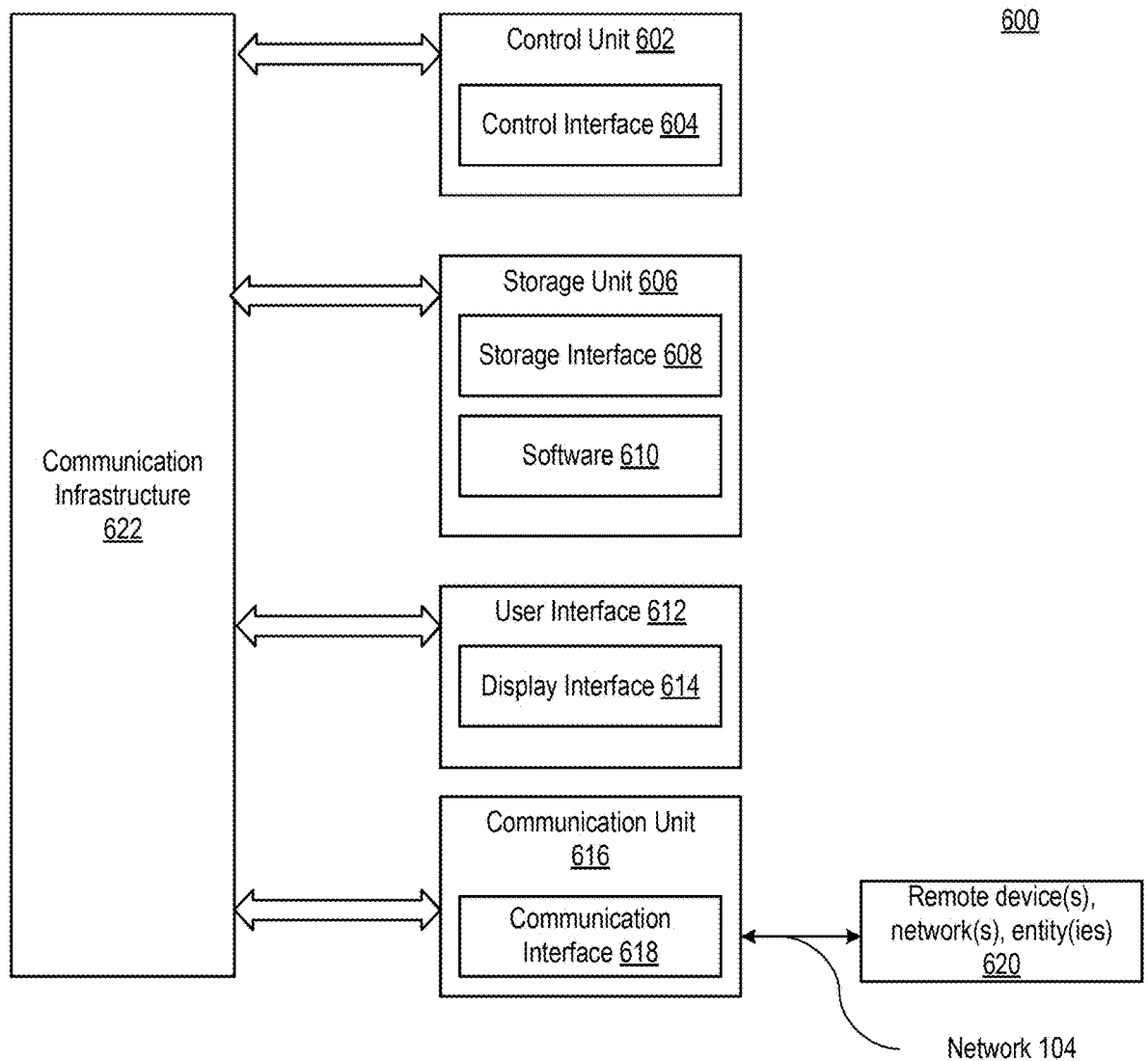
FIG. 6 is an example architecture of the components implementing the computing system, according to aspects of the present disclosure.

FIG. 6 is an example architecture 600 of the components implementing the computing system 100, according to aspects of the present disclosure. In aspects, the components may be a part of any of the devices of the computing system 100 (e.g., the first device 102 or the second device 106) and may be the hardware components on which the methods of the computing system 100 are performed. In aspects, the components can include a control unit 602, a storage unit 606, a communication unit 616, and a user interface 612. The control unit 602 may include a control interface 604. The control unit 602 may execute a software 610 to provide some or all of the intelligence of computing system 100. The control unit 602 may be implemented in a number of different ways. For example, the control unit 602 may be a processor, an application specific integrated circuit (ASIC), an embedded processor, a microprocessor, a hardware control logic, a hardware finite state machine (FSM), a digital signal processor (DSP), a field programmable gate array (FPGA), or a combination thereof.

The control interface 604 may be used for communication between the control unit 602 and other functional units or devices of computing system 100. The control interface 604 may also be used for communication that is external to the functional units or devices of computing system 100. The control interface 604 may receive information from the functional units or devices of computing system 100, or from remote devices 620, or may transmit information to the functional units or devices of computing system 100, or to remote devices 620. The remote devices 620 refer to units or devices external to computing system 100.

The control interface 604 may be implemented in different ways and may include different implementations depending on which functional units or devices of computing system 100 or remote devices 620 are being interfaced with the control unit 602. For example, the control interface 604 may be implemented with optical circuitry, waveguides, wireless circuitry, wireline circuitry to attach to a bus, an application programming interface, or a combination thereof. The control interface 604 may be connected to a communication infrastructure 622, such as a bus, to interface with the functional units or devices of computing system 100 or remote devices 620.

The storage unit 606 may store the software 610. For illustrative purposes, the storage unit 606 is shown as a single element, although it is understood that the storage unit 606 may be a distribution of storage elements. Also for illustrative purposes, the storage unit 606 is shown as a single hierarchy storage system, although it is understood that the storage unit 606 may be in a different configuration.

For example, the storage unit 606 may be formed with different storage technologies forming a memory hierarchical system including different levels of caching, main memory, rotating media, or off-line storage. The storage unit 606 may be a volatile memory, a nonvolatile memory, an internal memory, an external memory, or a combination thereof. For example, the storage unit 606 may be a nonvolatile storage such as nonvolatile random access memory (NVRAM), Flash memory, disk storage, or a volatile storage such as static random access memory (SRAM) or dynamic random access memory (DRAM).

The storage unit 606 may include a storage interface 608. The storage interface 608 may be used for communication between the storage unit 606 and other functional units or devices of computing system 100. The storage interface 608 may also be used for communication that is external to computing system 100. The storage interface 608 may receive information from the other functional units or devices of computing system 100 or from remote devices 620, or may transmit information to the other functional units or devices of computing system 100 or to remote devices 620. The storage interface 608 may include different implementations depending on which functional units or devices of computing system 100 or remote devices 620 are being interfaced with the storage unit 606. The storage interface 608 may be implemented with technologies and techniques similar to the implementation of the control interface 604.

The communication unit 616 may allow communication to devices, components, modules, or units of computing system 100 or to remote devices 620. For example, the communication unit 616 may permit the computing system 100 to communicate between its components or devices, for example the first device 102 and the second device 106. The communication unit 616 may further permit the devices of computing system 100 to communicate with remote devices 620 such as an attachment, a peripheral device, or a combination thereof through the network 104.

As indicated, the network 104 may span and represent a variety of networks and network topologies. For example, the network 104 may be a part of a network and include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the network 104. Cable, Ethernet, digital subscriber line (DSL), fiber optic lines, fiber to the home (FTTH), and plain old telephone service (POTS) are examples of wired communication that may be included in the network 104. Further, the network 104 may traverse a number of network topologies and distances. For example, the network 104 may include direct connection, personal area network (PAN), local area network (LAN), metropolitan area network (MAN), wide area network (WAN), or a combination thereof.

The communication unit 616 may also function as a communication hub allowing devices of the computing system 100 to function as part of the network 104 and not be limited to be an end point or terminal unit to the network 104. The communication unit 616 may include active and passive components, such as microelectronics or an antenna, for interaction with the network 104.

The communication unit 616 may include a communication interface 618. The communication interface 618 may be used for communication between the communication unit 616 and other functional units or devices of computing system 100 or to remote devices 620. The communication interface 618 may receive information from the other functional units or devices of computing system 100, or from remote devices 620, or may transmit information to the other functional units or devices of the system 100 or to remote devices 620. The communication interface 618 may include different implementations depending on which functional units or devices are being interfaced with the communication unit 616. The communication interface 618 may be implemented with technologies and techniques similar to the implementation of the control interface 604.

The user interface 612 may present information generated by computing system 100. In aspects, the user interface 612 allows a user of computing system 100 to interface with the devices of computing system 100 or remote devices 620. The user interface 612 may include an input device and an output device. Examples of the input device of the user interface 612 may include a keypad, buttons, switches, touchpads, soft-keys, a keyboard, a mouse, or any combination thereof to provide data and communication inputs. Examples of the output device may include a display interface 614. In aspects, the alternate path sequence 518 (of FIGS. 5C-5E) may be displayed on the display interface 614. The control unit 602 may operate the user interface 612 to present information generated by computing system 100. The control unit 602 may also execute the software 610 to present information generated by computing system 100, or to control other functional units of computing system 100. The display interface 614 may be any graphical user interface such as a display, a projector, a video screen, or any combination thereof.

Interactive GUIs of the System

FIGS. 7-9 show graphical user interfaces (GUIs) for displaying the alternate path sequence 518 (shown in FIGS. 5C-5E), and for allowing a user to interface with the computing system 100, according to aspects of the present disclosure. With respect to FIG. 7, an interactive interface 702 is shown. In aspects, the interactive interface 702 may be generated by the computing system 100, and transmitted to a device of the computing system 100 for display on a display unit. In aspects, the display unit may be the display interface 614 of FIG. 6. In aspects, the interactive interface 702 may be accessed via an application software or a web browser installed on one the of devices of the computing system 100. For example, in aspects, interactive interface 702 may be accessed via an application software or a web browser installed on the first device 102 or the second device 106.

In aspects, the interactive interface 702 can allow a user of the computing system 100 to interact and/or interface with the computing system 100. In aspects, the interactions can include, for example, selecting real-world destinations for which the computing system 100 can find alternate paths/routes to and from. In aspects, based on the selection, the computing system 100 can generate the alternate paths/routes based on the methods 200, 300, 400, 401, and 500, described above, and present the alternate paths/routes to the user via the interactive interface 702.

In aspects, the interactive interface 702 can further allow the user to interact with the computing system 100 by providing the user the ability to filter using and/or select criteria based on which the alternate paths/routes may be located. For example, in aspects, the user can select a particular carrier, which the user prefers to use. In the example shown in FIG. 7, 710 shows a drop down list of airlines that may be selected by the user. In aspects, based on the user selection, only paths/routes for the selected carrier may be filtered and displayed by the computing system 100.

In aspects, further filtering and/or selection criteria may be provided by the user to further refine and/or filter the paths/routes located by the computing system 100. For example, in aspects, the user can further select an arrival port using a drop down list that may be accessed via button 708. In the example, the arrival port may be a particular airport, seaport, bus terminal, etc., which may be the destination. In aspects, and as shown in FIG. 7, a further toggle button 706, may be used to further refine the paths/routes generated and/or located by the computing system 100 based on criteria such as minimizing drive times along the paths/routes, such that only paths/routes within a threshold distance or driving times may be located and/or displayed. Other criteria such as minimizing layover times, providing the fastest route, providing paths/routes within a certain monetary cost, required arrival and departure dates, etc. can also be used as filtering criteria.

In aspects, the interactive interface 702 can display the alternate paths/routes located by the computing system 100 based on the user provided filtering criteria. In FIG. 7, 704*a*-704*g* show examples of alternate paths/routes that have been located by the computing system 100 based on user provided filtering criteria. In aspects, 704*a*-704*g* can display further information related to each alternate paths/routes. In aspects, this information can include dates and times associated with the path/route, what carrier operates that path/route, information regarding the carrier and/or vessel, and further information regarding the path/route relative to other paths/routes (e.g., whether the path/route is the cheapest route in terms of monetary cost, whether the path/route is the fastest route to arrive at the destination, whether the carrier and/or vessel operating the path/route offers vessels that are freight friendly, etc.). In aspects, this information may be obtained from databases or repositories that store this information. In aspects, this information may be obtained and/or determined from the databases or repositories dynamically as the computing system 100 locates the alternate paths/routes.

As an example, 704*b*, displays a path/route with an associated departure date of Jul. 9, 2021. 704*b* also indicates the estimated transit time associated with the path/route which is from 14:30 PDT-22:24 EDT. The carrier may be displayed (e.g., United Airlines) and the information related to that carrier can also be displayed (e.g., the flight number is UA 2612 and the vessel to be used is a Boeing 737-900 airplane). 704*b* can also display the time of estimated arrival at the destination port (e.g., 11:20 PDT). 704*b* can further display ribbons or icons indicating further information regarding the path/route. In the example shown in FIG. 7, the icons shown with respect to 704*b* indicate that that path/route is the cheapest in terms of monetary cost compared to the other paths/routes, and is also freight friendly (meaning, for example, goods or personnel above a certain threshold mass, size, or heaviness can also be transported using that path/route).

In aspects, and based on the information displayed on interactive interface 702, a user of the computing system 100 can determine which of the alternate paths/routes is best suited for his or her particular transportation needs and choose that path/route. In aspects, this may be done via a button or icon or by clicking on the particular path/route desired.

With respect to FIG. 8, a second interactive interface 802 is shown. In aspects, the second interactive interface 802 can display a recommended path/route 804 to the user. In aspects, the recommended path/route 804 may be based on the various filtering criteria input by the user, and/or may be based on predictive algorithms implemented as a part of the methods for generating the alternate paths/routes by the computing system 100. For example, in aspects, if the user inputs certain filtering criteria for locating the paths/routes, the computing system 100 can use that criteria to generate and/or locate paths/routes that meet that criteria, and further recommend a path/route based on that criteria. In aspects, certain tie breaking criteria and/or rules can also be implemented to refine and/or optimize the recommendation. For example, if multiple paths/routes are located matching the filtering criteria, the computing system 100 can further choose a recommended path/route from amongst the multiple paths/routes by choosing a path/route that meets a further criteria, such as being the cheapest in terms of monetary cost, the fastest route to the destination, the path with the shortest layover, etc., as the recommended path/route.

In aspects, the computing system 100 can further use predictive algorithms to make a recommendation to the user. The predictive algorithms refer to an algorithm or a set of algorithms that may be implemented by the computing system 100 to learn patterns about the paths/routes, destinations, carriers, etc. over a period of time. In aspects, based on the learned patterns, the computing system 100 can make predictions about which paths/routes are likely to be the best paths/routes for a user. In aspects, the predictive algorithms can also take into account the user's filtering criteria when providing a recommendation. For example, if a user has a particular carrier he or she would like to use, the predictive algorithms can base the predictions made on learned information about that particular carrier and only make recommendations for that particular carrier. In aspects, the predictive algorithms may be trained using machine learning and/or artificial intelligence techniques, using tools such as TensorFlow™ to learn patterns about the paths/routes, destinations, carriers, etc.

In aspects, the predictive algorithms may be trained, for example, to learn patterns for a particular real-world destination. In aspects, the learned patterns may be, for example, related to what times and dates the paths/routes to the particular destination are busiest, what seasons if any the paths/routes to the particular destination have frequent delays, what days and/or months at the particular destination have unfavorable weather patterns such that transportation to and from the particular destination is interrupted or has to be re-routed frequently, etc. Similarly, the predictive algorithms may be trained to learn patterns about particular carriers. For example, the predictive algorithms may be trained to learn which carriers consistently meet their estimated arrival times, which carriers have frequent delays, which carriers have frequently broken or damaged vessels, the monetary costs associated with a particular carrier for paths/routes, etc. The aforementioned are examples of patterns that may be learned by the predictive algorithms. A POSA will recognize that other patterns consistent with the aforementioned examples can also be learned using the predictive algorithms.

In aspects, once trained, the predictive algorithms may be used to make recommendations regarding which paths/routes best fit the needs of the user. In this way, the computing system 100 can provide the best possible path/route to a user. Moreover, the predictive algorithms allow the computing system 100 to continuously learn patterns about which paths/routes may best fit the needs of users and optimize recommendations to users. The ability to do so can provide the computing system 100 the ability to recommend paths/routes that are determined to be the most reliable for transporting goods and personnel. In aspects, this can result in users saving money and time by taking the recommended paths/routes, because the most reliable paths/routes will more likely result in less of a chance that the users must re-route shipments due to weather, delays, unreliable carriers, etc.

With respect to FIG. 9, a third interactive interface 902 is shown. In aspects, the third interactive interface 902 may be part of the display of a transportation and/or logistics application software that may be accessed via a desktop application or via a browser. In aspects, the third interactive interface 902 can have the second interactive interface 802 integrated as part of the third interactive interface 902, such that a user of the third interactive interface 902 can have a recommended path/route to a destination shown to him or her, and have the ability to select that path/route when planning shipment of a good or personnel.

In aspects, the recommendation may be based on various inputs provided by the user via the third interactive interface 902 and/or based on the information stored regarding the shipment as shown in the various boxes and windows of the third interactive interface 902. In aspects, the information displayed and/or stored can provide the information and filtering criteria used by the computing system 100 to generate and/or locate the alternate paths/routes and/or the recommended path/route.

The above detailed description and aspects of the disclosed computing system 100 are not intended to be exhaustive or to limit the disclosed computing system 100 to the precise form disclosed above. While specific examples for computing system 100 are described above for illustrative purposes, various equivalent modifications are possible within the scope of the disclosed computing system 100, as those skilled in the relevant art will recognize. For example, while processes and methods are presented in a given order, alternative implementations may perform routines having steps, or employ systems having processes or methods, in a different order, and some processes or methods may be deleted, moved, added, subdivided, combined, or modified to provide alternative or sub-combinations. Each of these processes or methods may be implemented in a variety of different ways. Also, while processes or methods are at times shown as being performed in series, these processes or blocks may instead be performed or implemented in parallel, or may be performed at different times.

The resulting methods 200, 300, 400, 401, and 500 described above, and computing system 100 are cost-effective, highly versatile, and accurate, and may be implemented by adapting components for ready, efficient, and economical manufacturing, application, and utilization. Another important aspect of aspects of the present disclosure is that it valuably supports and services the historical trend of reducing costs, simplifying systems, and/or increasing performance.

These and other valuable aspects of the aspects of the present disclosure consequently further the state of the technology to at least the next level. While the disclosed aspects have been described as the best mode of implementing computing system 100, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense. Accordingly, the scope of the disclosure should be determined not by the aspects illustrated, but by the appended claims and their equivalents.

What is claimed is:

1. A computer implemented method for alternate path generation, the method comprising:
(a) identifying, by one or more computing devices, an optimal path to a destination node on a first graph, wherein the determining comprises:
locating one or more optimal path nodes,
locating one or more tree edges representing connections between the one or more optimal path nodes;
(b) generating, by the one or more computing devices, a path graph, wherein the generating comprises:
(i) generating a dummy node connected to the destination node as an entry point into the first graph,
(ii) generating a false edge indicating a connection from the destination node to the dummy node,
(iii) assigning the dummy node as a root node of the path graph,
(iv) locating an alternate path node on the first graph, wherein the alternate path node connects directly to the destination node or one of the one or more optimal path nodes,
(v) locating a sidetrack edge representing a connection from the alternate path node to the destination node or the one of the one or more optimal path nodes,
(vi) designating the identified sidetrack edge as a child node of the root node of the path graph,
(vii) identifying a detour cost associated with traversing the sidetrack edge to reach the destination node,
(viii) inserting the detour cost as a variable of the path graph,
(ix) locating a further alternate path node on the first graph, wherein the further alternate path node connects directly to the alternate path node,
(x) locating a further sidetrack edge representing a further connection from the further alternate path node to the alternate path node,
(xi) designating the identified further sidetrack edge as a further child node of the child node,
(xii) identifying a further detour cost associated with traversing the further sidetrack edge to reach the alternate path node,
(xiii) inserting the further detour cost as a further variable of the path graph,
(xiv) successively repeating (iv)-(xiii) until all alternate path nodes, further alternate path nodes, sidetrack edges, further sidetrack edges, detour costs, and further detour costs are determined for the first graph;
(c) generating, by the one or more computing devices, an alternate path sequence based on the path graph, wherein the generating comprises:
(xv) traversing from the root node of the path graph to the child node,
(xvi) locating the sidetrack edge associated with the child node,
(xvii) traversing the first graph from the destination node to the located sidetrack edge associated with the child node,
(xviii) based on locating the sidetrack edge, determining an alternative path is found,
(xix) traversing from the child node to the further child node,
(xx) locating the further sidetrack edge associated with the further child node,
(xxi) traversing the first graph from the destination node until the located further sidetrack edge associated with the further child node is located on the first graph,
(xxii) based on locating the further sidetrack edge, determining a further alternative path is found,
(xxiii) successively repeating (xv)-(xxii) until all alternative paths and further alternative paths are determined to be found; and
(d) generating, by the one or more computing devices, an interactive graphical user interface (GUI) for displaying the alternate path sequence; and
(e) transmitting, by the one or more computing devices, the interactive GUI to a display unit for display.

2. The method of claim 1, wherein identifying the optimal path to the destination node in (a) is based on applying either of Dijkstra's algorithm or A* algorithm.

3. The method of claim 2, further comprising applying either of Dijkstra's algorithm or A* algorithm up to a predetermined distance, wherein the predetermined distance represents a maximum numerical value one or more weights of the tree edges, the sidetrack edges, and the further sidetrack edge can sum to.

4. The method of claim 1, further comprising storing the path graph as an ordered heap data structure.

5. The method of claim 1, wherein identifying the detour cost associated with traversing the sidetrack edge to reach the destination node is determined by:
aggregating a first set of weights associated with the one or more tree edges representing connections between the one or more optimal path nodes to the destination node;
aggregating a second set of weights associated with taking the sidetrack edge to reach the destination node; and
subtracting the aggregated second set of weights from the aggregated first set of weights to determine the detour cost.

6. The method of claim 1, wherein identifying the further detour cost associated with traversing the further sidetrack edge to reach the alternate path node is determined by:
aggregating a third set of weights associated with the one or more tree edges representing connections between the one or more optimal path nodes to the alternate path node;
aggregating a fourth set of weights associated with taking the further sidetrack edge to reach the alternate path node;
subtracting the aggregated third set of weights from the aggregated fourth set of weights to determine the further detour cost.

7. The method of claim 1, further comprising:
receiving a user selection, via the interactive GUI, selecting a path from the alternate path sequence; and
generating, by the one or more computing devices, a transportation route based on the selected path to transport a person or a good.

8. A non-transitory computer readable medium including instructions for causing a processor to perform operations for alternate path generation, the operations comprising:
(a) identifying, by one or more computing devices, an optimal path to a destination node on a first graph, wherein the determining comprises:
locating one or more optimal path nodes,
locating one or more tree edges representing connections between the one or more optimal path nodes;

(b) generating, by the one or more computing devices, a path graph, wherein the generating comprises:
  (i) generating a dummy node connected to the destination node as an entry point into the first graph,
  (ii) generating a false edge indicating a connection from the destination node to the dummy node,
  (iii) assigning the dummy node as a root node of the path graph,
  (iv) locating an alternate path node on the first graph, wherein the alternate path node connects directly to the destination node or one of the one or more optimal path nodes,
  (v) locating a sidetrack edge representing a connection from the alternate path node to the destination node or the one of the one or more optimal path nodes,
  (vi) designating the identified sidetrack edge as a child node of the root node of the path graph,
  (vii) identifying a detour cost associated with traversing the sidetrack edge to reach the destination node,
  (viii) inserting the detour cost as a variable of the path graph,
  (ix) locating a further alternate path node on the first graph, wherein the further alternate path node connects directly to the alternate path node,
  (x) locating a further sidetrack edge representing a further connection from the further alternate path node to the alternate path node,
  (xi) designating the identified further sidetrack edge as a further child node of the child node,
  (xii) identifying a further detour cost associated with traversing the further sidetrack edge to reach the alternate path node,
  (xiii) inserting the further detour cost as a further variable of the path graph,
  (xiv) successively repeating (iv)-(xiii) until all alternate path nodes, further alternate path nodes, sidetrack edges, further sidetrack edges, detour costs, and further detour costs are determined for the first graph;
(c) generating, by the one or more computing devices, an alternate path sequence based on the path graph, wherein the generating comprises:
  (xv) traversing from the root node of the path graph to the child node,
  (xvi) locating the sidetrack edge associated with the child node,
  (xvii) traversing the first graph from the destination node to the located sidetrack edge associated with the child node,
  (xviii) based on locating the sidetrack edge, determining an alternative path is found,
  (xix) traversing from the child node to the further child node,
  (xx) locating the further sidetrack edge associated with the further child node,
  (xxi) traversing the first graph from the destination node until the located further sidetrack edge associated with the further child node is located on the first graph,
  (xxii) based on locating the further sidetrack edge, determining a further alternative path is found,
  (xxiii) successively repeating (xv)-(xxii) until all alternative paths and further alternative paths are determined to be found; and
(d) generating, by the one or more computing devices, an interactive graphical user interface (GUI) for displaying the alternate path sequence; and (e) transmitting, by the one or more computing devices, the interactive GUI to a display unit for display.

9. The non-transitory computer readable medium of claim 8, wherein the operations further comprise identifying the optimal path to the destination node in (a) based on applying either of Dijkstra's algorithm or A* algorithm.

10. The non-transitory computer readable medium of claim 9, wherein the operations further comprise applying either of Dijkstra's algorithm or A* algorithm up to a predetermined distance, wherein the predetermined distance represents a maximum numerical value one or more weights of the tree edges, the sidetrack edges, and the further sidetrack edge can sum to.

11. The non-transitory computer readable medium of claim 8, wherein the operations further comprise storing the path graph as an ordered heap data structure.

12. The non-transitory computer readable medium of claim 8, wherein the operations further comprise identifying the detour cost associated with traversing the sidetrack edge to reach the destination node is determined by:
  aggregating a first set of weights associated with the one or more tree edges representing connections between the one or more optimal path nodes to the destination node;
  aggregating a second set of weights associated with taking the sidetrack edge to reach the destination node; and
  subtracting the aggregated second set of weights from the aggregated first set of weights to determine the detour cost.

13. The non-transitory computer readable medium of claim 8, wherein the operations further comprise identifying the further detour cost associated with traversing the further sidetrack edge to reach the alternate path node is determined by:
  aggregating a third set of weights associated with the one or more tree edges representing connections between the one or more optimal path nodes to the alternate path node;
  aggregating a fourth set of weights associated with taking the further sidetrack edge to reach the alternate path node;
  subtracting the aggregated third set of weights from the aggregated fourth set of weights to determine the further detour cost.

14. The non-transitory computer readable medium of claim 8, wherein the operations further comprise:
  receiving a user selection, via the interactive GUI, selecting a path from the alternate path sequence; and
  generating, by the one or more computing devices, a transportation route based on the selected path to transport a person or a good.

15. A computing system for alternate path generation comprising:
  a storage unit to store instructions;
  a control unit, coupled to the storage unit, configured to process the stored instructions to:
    (a) identify an optimal path to a destination node on a first graph, wherein the determining comprises:
      locating one or more optimal path nodes,
      locating one or more tree edges representing connections between the one or more optimal path nodes;
    (b) generate a path graph, wherein the generating comprises:
      (i) generating a dummy node connected to the destination node as an entry point into the first graph, (ii) generating a false edge indicating a connection from the destination node to the dummy node, (iii) assigning the dummy node as a root node of the path graph, (iv) locating an alternate path node on the first graph, wherein the alternate path node connects directly to the destination node or one of the one or more optimal path nodes, (v) locating a sidetrack edge representing a connection from the alternate path node to the destination node or the one of the one or more optimal path nodes, (vi) designating the identified sidetrack edge as a child node of the root node of the path graph, (vii) identifying a detour cost associated with traversing the sidetrack edge to reach the destination node, (viii) inserting the detour cost as a variable of the path graph, (ix) locating a further alternate path node on the first graph, wherein the further alternate path node connects directly to the alternate path node, (x) locating a further sidetrack edge representing a further connection from the further alternate path node to the alternate path node, (xi) designating the identified further sidetrack edge as a further child node of the child node, (xii) identifying a further detour cost associated with traversing the further sidetrack edge to reach the alternate path node, (xiii) inserting the further detour cost as a further variable of the path graph, (xiv) successively repeating (iv)-(xiii) until all alternate path nodes, further alternate path nodes, sidetrack edges, further sidetrack edges, detour costs, and further detour costs are determined for the first graph;

(c) generate an alternate path sequence based on the path graph, wherein the generating comprises:

(xv) traversing from the root node of the path graph to the child node, (xvi) locating the sidetrack edge associated with the child node, (xvii) traversing the first graph from the destination node to the located sidetrack edge associated with the child node, (xviii) based on locating the sidetrack edge, determining an alternative path is found, (xix) traversing from the child node to the further child node, (xx) locating the further sidetrack edge associated with the further child node, (xxi) traversing the first graph from the destination node until the located further sidetrack edge associated with the further child node is located on the first graph, (xxii) based on locating the further sidetrack edge, determining a further alternative path is found, (xxiii) successively repeating (xv)-(xxii) until all alternative paths and further alternative paths are determined to be found; and (d) generate an interactive graphical user interface (GUI) for displaying the alternate path sequence;

a communications unit, coupled to the storage unit, configured to process the stored instructions to:

(e) transmit the interactive GUI to a display unit for display;

(f) receive a user selection, via the interactive GUI, selecting a path from the alternate path sequence; and wherein:
the control unit is further configured to (g) generate a transportation route based on the selected path to transport a person or a good.

16. The computing system of claim 15, wherein the control unit is further configured to identify the optimal path to the destination node in (a) based on applying either of Dijkstra's algorithm or A* algorithm.

17. The computing system of claim 16, wherein the control unit is further configured to apply either of Dijkstra's algorithm or A* algorithm up to a predetermined distance, wherein the predetermined distance represents a maximum numerical value one or more weights of the tree edges, the sidetrack edges, and the further sidetrack edge can sum to.

18. The computing system of claim 15, wherein:
the control unit is further configured to generate the path graph as an ordered heap data structure; and
the storage unit is further configured to store the path graph as the ordered heap data structure.

19. The computing system of claim 15, wherein the control unit is further configured to identify the detour cost associated with traversing the sidetrack edge to reach the destination node is determined by:
aggregating a first set of weights associated with the one or more tree edges representing connections between the one or more optimal path nodes to the destination node;
aggregating a second set of weights associated with taking the sidetrack edge to reach the destination node; and
subtracting the aggregated second set of weights from the aggregated first set of weights to determine the detour cost.

20. The computing system of claim 15, wherein the control unit is further configured to identify the further detour cost associated with traversing the further sidetrack edge to reach the alternate path node is determined by:
aggregating a third set of weights associated with the one or more tree edges representing connections between the one or more optimal path nodes to the alternate path node;
aggregating a fourth set of weights associated with taking the further sidetrack edge to reach the alternate path node;
subtracting the aggregated third set of weights from the aggregated fourth set of weights to determine the further detour cost.

* * * * *